United States Patent
Chen et al.

(10) Patent No.: US 11,712,682 B2
(45) Date of Patent: Aug. 1, 2023

(54) CATALYST, PYROLYSIS DEVICE AND PYROLYSIS METHOD

(71) Applicants: Kuan-Hsin Chen, Taipei (TW); Chien-Fa Huang, Taipei (TW); Kuan-Yu Chen, Taipei (TW); Kuan-Ta Chen, Taipei (TW)

(72) Inventors: Huang-Chuan Chen, Taipei (TW); Kuan-Hsin Chen, Taipei (TW); Yi-Yu Wang, Taipei (TW); Chien-Fa Huang, Taipei (TW); Kuan-Yu Chen, Taipei (TW); Kuan-Ta Chen, Taipei (TW)

(73) Assignees: Kuan-Hsin Chen, Taipei (TW); Chien-Fa Huang, Taipei (TW); Kuan-Yu Chen, Taipei (TW); Kuan-Ta Chen, Taipei (TW)

( * ) Notice: Subject to any disclaimer, the term of this patent is extended or adjusted under 35 U.S.C. 154(b) by 54 days.

(21) Appl. No.: 17/402,284

(22) Filed: Aug. 13, 2021

(65) Prior Publication Data
US 2022/0048012 A1 Feb. 17, 2022

(30) Foreign Application Priority Data

Aug. 14, 2020 (TW) ................................. 109127787
Jan. 18, 2021 (TW) ................................. 110101847

(51) Int. Cl.
*B01J 29/06* (2006.01)
*B01J 21/06* (2006.01)
(Continued)

(52) U.S. Cl.
CPC ............... *B01J 29/06* (2013.01); *B01J 21/04* (2013.01); *B01J 21/063* (2013.01); *B01J 21/16* (2013.01);
(Continued)

(58) Field of Classification Search
CPC . B01J 21/04; B01J 21/063; B01J 21/08; B01J 21/16; B01J 23/002; B01J 23/04; B01J 23/745; B01J 29/06; B01J 29/072; B01J 35/0006; B09B 3/40; B09B 3/70; C10B 3/02; C10B 7/00; C10B 27/06; C10B 47/18; C10B 53/00; C10B 53/07; C10B 57/06; C10G 1/04; C10G 1/10;
(Continued)

(56) References Cited

FOREIGN PATENT DOCUMENTS

EP 2860450 B1 12/2016
WO WO2017/128943 A1 8/2017
(Continued)

OTHER PUBLICATIONS

Machine translation of Zhang et al (CN 106829955) published Jun. 13, 2017, 3 pp.*

*Primary Examiner* — Brian A McCaig
(74) *Attorney, Agent, or Firm* — Muncy, Geissler, Olds & Lowe, P.C.

(57) ABSTRACT

A catalyst is illustrated, which has 70-90 parts by weight of mica, 1-10 parts by weight of zeolite, 5-15 parts by weight of titanium dioxide, 1-10 parts by weight of aluminum oxide, 1-5 parts by weight of sodium oxide and 1-5 parts by weight of potassium oxide. The present disclosure also illustrates a pyrolysis device using the catalyst, and further illustrates a pyrolysis method using the catalyst and/or the pyrolysis device for thermally cracking an organic polymer.

27 Claims, 9 Drawing Sheets

(51) Int. Cl.
    *B01J 21/04*     (2006.01)
    *B01J 23/04*     (2006.01)
    *B01J 23/745*     (2006.01)
    *B01J 29/072*     (2006.01)
    *B01J 35/00*     (2006.01)
    *C10B 57/06*     (2006.01)
    *C10B 3/02*     (2006.01)
    *C10B 27/06*     (2006.01)
    *C10B 7/00*     (2006.01)
    *C10B 53/00*     (2006.01)
    *C10G 1/04*     (2006.01)
    *C10G 1/10*     (2006.01)
    *B01J 21/16*     (2006.01)

(52) U.S. Cl.
    CPC ............. *B01J 23/04* (2013.01); *B01J 23/745* (2013.01); *B01J 29/072* (2013.01); *B01J 35/0006* (2013.01); *C10B 3/02* (2013.01); *C10B 7/00* (2013.01); *C10B 27/06* (2013.01); *C10B 53/00* (2013.01); *C10B 57/06* (2013.01); *C10G 1/04* (2013.01); *C10G 1/10* (2013.01); *C10G 2300/1003* (2013.01); *C10G 2300/301* (2013.01); *C10G 2300/308* (2013.01); *C10G 2300/70* (2013.01)

(58) Field of Classification Search
    CPC ...... C10G 2300/1003; C10G 2300/301; C10G 2300/308; C10G 2300/70; C10G 2400/02; C10G 2400/04; Y02P 20/143; C10K 1/002; C10K 1/04; C10K 1/08
    See application file for complete search history.

(56) References Cited

FOREIGN PATENT DOCUMENTS

| WO | WO2019/080187 A1 | 5/2019 | |
|----|----|----|----|
| WO | WO2019/085528 A1 | 5/2019 | |
| WO | WO 2019/166980 A1 * | 9/2019 | ............ C10B 19/00 |

* cited by examiner

CATALYST, PYROLYSIS DEVICE AND PYROLYSIS METHOD

BACKGROUND

Technical Field

The present disclosure relates to a catalyst, a pyrolysis device and a pyrolysis method in a pyrolysis field, in particular to, a catalyst used for thermally cracking an organic maerail and/or organic polymer of a waste, a pyrolysis device using the catalyst and a pyrolysis method using the catalyst and/or the pyrolysis device for thermally cracking the organic polymer. The present disclosure further directs to a catalyst used for thermally cracking a thermosetting and thermoplastic organic polymers, a treatment device for a waste organic polymer and a waste solar panel and a treatment method for a waste organic polymer and a waste solar panel.

Related Art

For the treatment of wastes containing organic polymers, it is currently known to use incineration and thermal cracking (or pyrolysis) methods, as the incineration method will produce smoke damage, resulting in secondary pollution, carbon emissions and other problems mentioned in the European patent of EP2860450B1 Therefore, the use of thermal cracking is more in line with the carbon dioxide control requirements adopted by the 2005 United Nations Framework Convention on Climate Change (UNFCCC) Kyoto Protocol. Another advantage of using thermal cracking is that it can simultaneously crack organic polymers in waste into renewable resources such as heavy oil, light fuel oil, petroleum gas and coke with high added value, so the waste can be treated as raw material and renewable resources and re-create economic benefits.

In the European patent of EP2860450B1, it is mentioned that, based on the very low thermal conductivity characteristics of the organic polymers in the waste, a pre-treatment (such as, waste crushing) must be carried out before putting the waste into the thermal cracking furnace. The temperature will be set between 350 and 850 degrees Celsius, including the thermal cracking temperature of the first stage between 350 and 500 degrees Celsius and the thermal cracking temperature of the second stage between 700 and 850 degrees Celsius. Similarly, a PCT patent application of WO2019/080187A1 also mentions that the waste must be crushed to a particle size range of 1-30 mm. However, even if the waste is crushed to a small particle size range, based on the low thermal conductivity of organic polymers again, the thermal cracking temperature still must be set between 300 and 900 degrees Celsius. In a PCT patent application of WO2019/085528A1, the organic waste is crushed into blocks of 50-100 mm and the thermal cracking temperature is between 450 and 550 degrees Celsius, and it is clearly stated that the thermal cracking temperature must be higher than 300 degrees Celsius to make the pyrolysis start and occur. In addition, in a PCT patent application of WO2017/128943A1, the waste is crushed into particles smaller than 3 cm, the thermal cracking temperature is between 400 and 850 degrees Celsius, and a catalyst is added for the pyrolysis.

According to the teachings of the aforementioned four patents or patent applications, to treat the waste containing organic polymers, the waste must be crushed and the thermal cracking temperature must be set to be higher than 300 degrees Celsius. Especially when thermally cracking the thermosetting organic polymers in the waste, the temperature needs to be between 650 and 900 degrees Celsius, which consumes a lot of energy. In fact, as described in the PCT patent application of WO2017/128943A1, the catalyst is added in the thermal cracking process, but the thermal cracking temperature still needs to be as high as 400 degrees Celsius. Obviously, the aforementioned four patents or patent applications show that thermal cracking cannot be carried out at temperatures below 300 degrees Celsius. However, the higher the thermal cracking temperature is, the new and/or unpredictable compounds will also be produced when the organic polymers are cracked. Therefore, it will cause bad or inappropriate influence on the types, purity and quality of the subsequent production of combustible gas, liquid compounds (solvents) and regenerated oil.

Furthermore, the waste crushing also creates problems. For example, if the waste is a transformer with a plastic casing, the entire transformer must be manually separated from metal and plastic in a destructive manner firstly, and the plastic is crushed as described in the four aforementioned patents, which may generate dust and cause inhalation hazard to human body. In addition, the organic varnish coated on the outside of the copper wire of the entire coil in the transformer cannot be manually separated, and then the copper particles recycled after being crushed and thermally cracked must be melted again, and then they can be reproduced as the coil. It is practically impossible to obtain a complete coil of copper wire and to efficiently carry out subsequent resource utilization. Of course, another one conventional manner is to bury the entire transformer waste, but it is obvious that the method of burying cannot be used for subsequent resource utilization. Another example of conventional crushing and/or burying methods is the processing of organic polymers composite materials in waste cars, for example, composite material and automobile shredded residue (ASR) of steering wheels, dashboards, car interiors, which is composed of polyurethane, acrylic, rubber, polypropylene and polyethylene are similarly unable to be subsequently recycled.

Another obvious example is the waste solar panels, which are currently divided into silicon-based solar panels and cadmium telluride (CdTe) thin-film solar panels. The solar panels include (1) aluminum frames accounting for about 17%-20%; (2) glass plate, ethylene-vinyl acetate (EVA) transparent glue, silicon crystal plate (or cadmium telluride) and a small amount of precious metals accounting for about 65-70%; (3) polyethylene terephthalate (PET) backlight plate (coated with polyvinyl fluoride) accounting for about 7-8%; and (4) wire boxes. The usual method is to first disassemble and recycle the aluminum frame or inorganic matter in a destructive manner. This method consumes labor, and the organic matter and the inorganic matter cannot be completely separated by disassembling the aluminum frame or inorganic matter in a destructive manner. Therefore, the disassembled aluminum frame or inorganic material can also cause secondary pollution in the recycling process due to the sticky of the transparent glue, the thermosetting polymers and thermoplastic organic polymers, which hinders subsequent resource utilization and efficiency. After the glass plate and the silicon crystal plate are crushed together, a dust problem occurs, and both of them are silicon-containing substances. Because of the similar properties (such as specific gravity), it is difficult to completely separate the glass and the silicon crystal. As a result, because of the difficulty of complete separation of glass and silicon crystal, it causes difficulty to recycle the precious metals (silver, copper, tin, lead, zinc) existing in the silicon crystal plate.

Among the aforementioned waste solar panels, and similar waste printed circuit boards (PCBs), various transformers and converters, polarizers and high-voltage power cables, these waste organic polymers are all added with halide (i.e. halogenated compounds, for example, fluorine, bromine) which are used as flame retardants, such as fat-soluble brominated flame retardants that are easier to accumulate in the human body. However, none of the aforementioned four patents or patent applications disclose the technology for capturing halide in the thermal cracking process or device.

In addition, since the aforementioned PCT patent application of WO2019/085528A1 uses a closed cracking furnace, when the heating of the furnace body is accidentally stopped, such as a sudden power failure that cause the heating of the furnace body to be stopped, the residual heat of the furnace body will make the organic polymers in the cracking furnace continue to produce pyro gas, which also causes the risk of explosion in the cracking furnace.

The aforementioned pre-treatment procedures before the waste is put into the hot cracking furnace usually include using water to clean the organic or inorganic pollutants, dust, sand and gravel adhering to the waste, which not only wastes water resources, but also produces the waste water that causes another pollution.

SUMMARY

One of the objectives of the present disclosure is to provide a catalyst that enables organic polymers (especially, thermosetting organic polymers) in waste to undergo thermal cracking reaction at a temperature below 300 degrees Celsius, so that the thermal cracking reaction is low energy consumption, and produces high-quality recycled oil products.

In order to achieve the above objective, one aspect of the present disclosure is to provide a catalyst for thermal cracking or decomposition of thermosetting and thermoplastic organic polymers in waste. The weight of the catalyst is 100 parts by weight (or 100 wt %). The catalyst comprises: 70-90 parts by weight (70-90 wt %) of mica; 1-10 parts by weight (1-10 wt %) of zeolite; 5-15 parts by weight (5-15 wt %) of titanium dioxide; 1-10 parts by weight (1-10 wt %) of aluminium oxide; 1-5 parts by weight (1-5 wt %) of sodium oxide; and 1-5 parts by weight (1-5 wt %) of potassium oxide.

In embodiments of the present disclosure, the mica is selected from at least one of muscovite mica, hydromica, bronze mica, didymite, zinnwaldite and lithium mica.

In embodiments of the present disclosure, the zeolite is selected from at least one of echellite, stilbite, heulandite, scolecite, chabazite, mordenite and cubicite.

In embodiments of the present disclosure, the catalyst further comprises at least one of silicon dioxide, calcium oxide, aluminum oxide, ferric oxide and magnesium oxide.

In embodiments of the present disclosure, the catalyst further comprises 1-3 parts by weight of solid base, and the solid base com comprise at least one of sodium hydroxide, sodium carbonate, sodium bicarbonate, potassium hydroxide, potassium carbonate, calcium hydroxide and calcium carbonate.

Another objective of the present disclosure is to provide a pyrolysis device and pyrolysis method that can capture halogens, maintain the pyro gas channel to have a slight positive pressure to prevent explosions, recycle the whole waste without being crushed, easily recycle precious metal, and perform the process without waste water.

To achieve the above objective of the present disclosure, a pyrolysis device is provided to treat waste organic polymers and waste solar panels. The pyrolysis device comprises a furnace body, having a furnace roof, a furnace bottom and a furnace wall; an agitator shaft, disposed upright in the furnace body, provided with multiple agitator sheets; a thermal jacket, disposed on an outer side of the furnace wall; a charge port, disposed on the furnace roof an exhaust vent, disposed on the furnace roof and a discharge port, disposed on the furnace bottom; and a horizontal semi-synchronous thermal cracking auxiliary furnace, connected to the discharge port of the vertical thermal cracking main furnace.

In embodiments of the present disclosure, the exhaust vent of the vertical thermal cracking main furnace has baffle extending into the furnace body, and the baffle substantially parallel to the furnace roof.

In embodiments of the present disclosure, the vertical thermal cracking main furnace further comprises heat conduction components arranged between the thermal jacket and the furnace wall.

In embodiments of the present disclosure, the heat conduction component is composed of heat conduction fins.

In embodiments of the present disclosure, the thermal jacket comprises a hot air inlet, a hot air outlet, spacer plates and vents, the spacer plates are arranged at intervals between the hot air inlet and the hot air outlet, and the vents are arranged on the spacer plates.

In embodiments of the present disclosure, the charge port comprises: a first stage charge port, having a first knife gate; a second stage charge port, having a second knife gate; and a third stage charge port, having a third knife gate, where when the first knife gate is opened, the second knife gate and the third knife gate are closed; when the second knife gate is opened, the first knife gate and the third knife gate are closed; and when the third knife gate is opened, the first knife gate and the second knife gate are closed.

In embodiments of the present disclosure, the pyrolysis device further comprises: a heat exchanger, connected to a hot air outlet of the thermal jacket; an expansion tank, connected a working fluid outlet of the heat exchanger; a heater, connected to a hot air inlet of the thermal jacket and a liquid outlet of the expansion tank; an initial separation tank, connected to the exhaust vent of the vertical thermal cracking main furnace; a condenser, connected to the initial separation tank; a halide recycling device, connected to the condenser; and an air storage tank, connected to the halide recycling device.

Another objective of the present disclosure is to provide a pyrolysis method which can treat waste organic polymers and waste solar panels. The pyrolysis method comprises steps of: (i) putting a waste and one of the above catalysts into the cracking furnace of one of the above pyrolysis devices for performing a thermal cracking reaction, so as to generate a first stage pyro gas comprising a halogen gas; (ii) exhausting the first stage pyro gas comprising the halogen gas out from the exhaust vent of the cracking furnace; (iii) after the first stage pyro gas is exhausted out from the exhaust vent, flowing the first stage pyro gas into the initial separation tank to remove a dust in the first stage pyro gas to form a second stage pyro gas comprising the halogen gas; (iv) flowing the second stage pyro gas into a first condenser for gas-liquid separation to generate a first stage pyro oil and a third stage pyro gas comprising the halogen gas, wherein a temperature of the first condenser is 80-120 degrees Celsius; and (v) flowing the third stage pyro gas comprising the halogen gas into the halide recycling device to generate a fuel gas and a halide, wherein the recycling device therefore comprises a captured halogen solvent.

In embodiments of the present disclosure, before step (i) is performed, the pyrolysis method further comprises a step of crushing the waste.

In embodiments of the present disclosure, after step (iv) is performed, the pyrolysis method further comprises steps of: condensing the first stage pyro oil by using a second condenser to generate a second stage pyro oil; and putting the second stage pyro oil into a regenerative energy oil tank to stand still for oil-water separation.

In embodiments of the present disclosure, the captured halogen solvent comprises a potassium-containing aqueous solution, a sodium-containing aqueous solution or a calcium-containing aqueous solution.

Another objective of the present disclosure is to provide a pyrolysis device used to treat waste organic polymers and waste solar panels. The pyrolysis device comprises: a charge chamber, a pyrolysis chamber and a resting chamber, where the pyrolysis chamber is located between the charge chamber and the resting chamber; a first gate, disposed between the charge chamber and the pyrolysis chamber, being capable of rising or descending between the charge chamber and the pyrolysis chamber; a second gate, disposed between the pyrolysis chamber and the resting chamber, being capable of rising or descending between the pyrolysis chamber and the resting chamber; and a disk transport device, comprising support disks, wherein the disk transport device transports among the charge chamber, the pyrolysis chamber and the rest chamber, and each of the support disks has a placement notch, and a bottom of the placement notch has grooves.

In embodiments of the present disclosure, the pyrolysis chamber comprises an exhaust vent and a slag discharge port, the exhaust vent is located on a ceiling of the pyrolysis chamber, and the slag discharge port is located on a bottom of the pyrolysis chamber.

In embodiments of the present disclosure, each support disk comprises a hot kerosene tube buried in the support disk.

In embodiments of the present disclosure, a thickness of the support disk is 4-6 cm.

In embodiments of the present disclosure, a distance between the support disks is 8-12 cm.

In embodiments of the present disclosure, the charge chamber has a first wing plate surrounding an outer wall of the charge chamber, the pyrolysis chamber has a second wing plate surrounding an outer wall of the pyrolysis chamber, and the first gate is arranged between the first wing plate and the second wing plate and capable of rising or descending between the first wing plate and the second wing plate.

In embodiments of the present disclosure, the pyrolysis device further comprises: a pressure imposing element, sealing the first wing plate, the first gate and the second wing plate.

In embodiments of the present disclosure, the pyrolysis device further comprises: two sealing layers, respectively disposed on the first wing plate and the second wing plate.

In embodiments of the present disclosure, the pyrolysis chamber has a first wing plate surrounding an outer wall of the pyrolysis chamber, the resting chamber has a second wing plate surrounding an outer wall of the resting chamber, and the second gate is arranged between the first wing plate and the second wing plate and capable of rising or descend between the first wing plate and the second wing plate.

In embodiments of the present disclosure, the pyrolysis device further comprises: a pressure imposing element, sealing the first wing plate, the second gate and the second wing plate.

In embodiments of the present disclosure, the pyrolysis device further comprises: two sealing layers, respectively disposed on the first wing plate and the second wing plate.

Another objective of the present disclosure is to provide a pyrolysis method which can treat waste organic polymers and waste solar panels. The pyrolysis method comprises steps of: (i) putting one of the above catalysts into the grooves of one of the support disks of one of the above pyrolysis devices; (ii) putting a waste to the placement notch into one of the support disks, wherein the waste directly contacts the catalyst, and the waste is not treated with crushing; and (iii) transporting the disk transport device from the charge chamber to the pyrolysis chamber for performing a thermal cracking reaction, wherein after the thermal cracking reaction is performed on the waste, a fuel gas, a pyrolysis oil, a ash and a residual waste are generated, and the residual waste does not comprises any thermosetting and thermoplastic polymers.

In embodiments of the present disclosure, the thermal cracking reaction comprises a first stage thermal cracking reaction and a second stage thermal cracking reaction, a temperature of the first stage thermal cracking reaction is 205-230 degrees Celsius, and a temperature of the second stage thermal cracking reaction is 350-370 degrees Celsius.

In embodiments of the present disclosure, after step (iii) is performed, the pyrolysis method further comprises a step of: transporting the disk transport device from the pyrolysis chamber to the resting chamber for condensing.

In embodiments of the present disclosure, after the fuel gas is exhausted out from the exhaust vent of pyrolysis chamber, the fuel gas flows into a fuel gas storage tank.

The above descriptions are only used to illustrate the problem to be solved by the present disclosure, the technical means to solve the problem and the effects produced by them, etc. The specific details of the present disclosure are described in detail in the following embodiments and related drawings.

DESCRIPTIONS OF DRAWINGS

When reading in conjunction with the accompanying drawings, the detailed descriptions of the embodiments of the present disclosure will be fully understood. It should be noted that according to industry standard practices, the features are not drawn to scale and are used for illustration purposes only. In fact, for the purpose of clarity, the size of each feature can be increased or decreased arbitrarily. In the descriptions and drawings, the same reference numerals indicate similar features.

DESCRIPTIONS OF EMBODIMENTS

Figure 1:
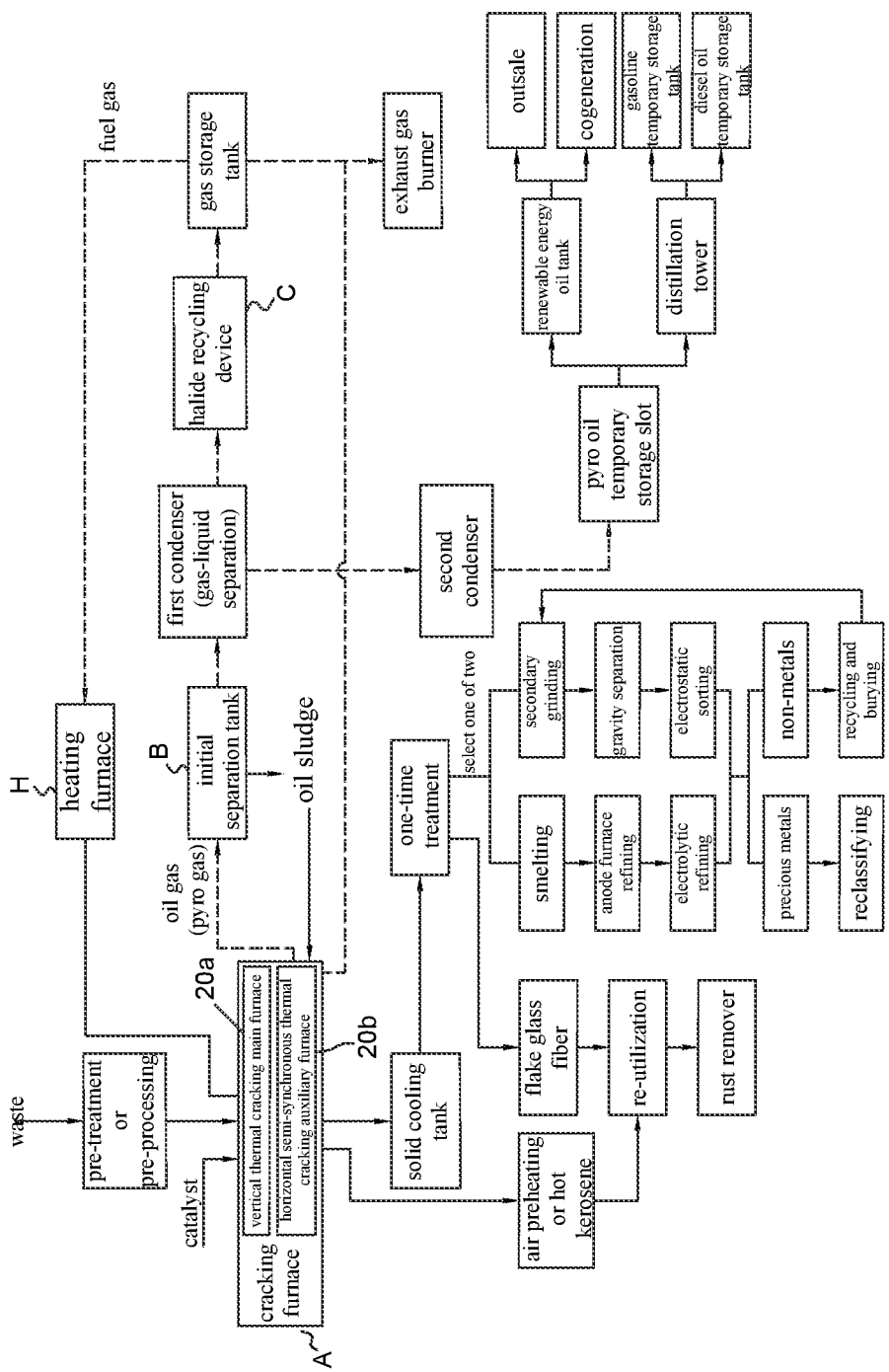
FIG. 1 is a flow chart of operation of a pyrolysis device according to an embodiment of the present disclosure.

In order to make the descriptions of the present disclosure more detailed and complete, the following provides illustrative descriptions for the implementation aspects and specific embodiments of the present disclosure; however, these are not the only ways to implement or use the specific embodiments of the present disclosure. The embodiments disclosed below can be combined or substituted with each other under beneficial circumstances, and other embodiments can also be added to an embodiment without further descriptions or explanations.

The following disclosure provides many different embodiments or examples to implement different features of the multiple embodiments of the present disclosure. The following content describes specific examples of each component and its arrangement to simplify the descriptions. Of course, these specific examples are not meant to be limiting. The multiple embodiments of the present disclosure will be described with reference to specific embodiments and with reference to certain drawings. However, the multiple embodiments of the present disclosure are not limited to the specific embodiments and drawings, but are only limited to the scope of the claim descriptions. The drawings described are only exemplary and non-limiting. In the drawings, for illustrative purposes, the size of some elements can be enlarged and not drawn to scale. The size and relative size do not necessarily correspond to the actual thumbnails used for implementation.

In addition, the terms top, bottom, over, under, and the like in the description and the scope of claims are for descriptive purposes, and are not necessarily used to describe relative positions. It should be understood that the terms so used are interchangeable under appropriate circumstances, and the specific embodiments described herein can be operated in other positions than those described or illustrated herein.

It should be noted that the term "comprise" used in the scope of claims should not be understood as being limited to the means listed thereafter; it does not exclude other elements or operations. Therefore it is understood to specify the existence or addition of the stated feature, whole, operation or component as mentioned, but does not exclude the existence or addition of one or more other features, wholes, operations or components or groups thereof. Therefore, the description scope of "apparatus comprises devices A and B" should not be limited to apparatus consisting of devices A and B only. It is noted that the term "placement notch" in the present disclosure means a receptacle or container with a top that is open to the atmosphere.

An objective of the present disclosure is to provide a catalyst, and the use of the catalyst is illustrated as follows. The catalyst is suitable for thermal cracking of organics and/or organic polymers in waste. For example, the catalyst is suitable for thermal cracking or decomposition of thermosetting and thermoplastic organic polymers in waste. For the convenience of descriptions, the catalyst will be described and illustrated below as a catalyst that thermally cracks the thermosetting and thermoplastic organic polymers. Therefore, those with ordinary skill in the art of the technical field of the present disclosure can recognize that a catalyst for the thermal cracking of the thermosetting and thermoplastic organic polymers refers to the catalyst of the present disclosure. The weight of the catalyst is 100 parts by weight (or 100 wt %), and comprises: 70-90 parts by weight (70-90 wt %) of mica; 1-10 parts by weight (1-10 wt %) of zeolite; 5-15 parts by weight (5-15 wt %) of titanium dioxide; 1-10 parts by weight (1-10 wt %) of aluminium oxide; 1-5 parts by weight (1-5 wt %) of sodium oxide; and 1-5 parts by weight (1-5 wt %) of potassium oxide. The catalyst is characterized by that the compositions (mica, zeolite, titanium dioxide and aluminum oxide) of the catalyst are all materials with high chemical stability, abundant output and easy access. In addition, this catalyst can be recycled and reused after participating in the thermal cracking reaction, or it will remain in the carbon residue. For example, the "carbon residue" produced after thermal cracking of waste rubber (including tires) can be made into high-quality "carbon black" (similar to N660 and/or N550) or "activated carbon", and the catalyst remaining in the carbon residue is compatible with this product and does not affect product quality. It is understandable that the addition ratio of each composition of the above catalyst will be adjusted according to whether catalyst is subsequently processed, whether the waste contains bromine and/or fluorine, and other conditions. For example, the sodium oxides and potassium oxides in the catalyst help to capture the halogens (bromine and/or fluorine) contained in waste organic polymers. The use of sodium oxides and potassium oxides in the catalyst is the first halogen capture mechanism among the three halogen capture mechanisms of the present disclosure.

In embodiments of the present disclosure, the catalyst can comprise 75, 80 or 85 parts by weight of the mica. In embodiments of the present disclosure, the catalyst can comprise 2, 4, 6 or 8 parts by weight of the zeolite. In embodiments of the present disclosure, the catalyst can comprise 7, 9, 11 or 13 parts by weight of the titanium dioxide. In embodiments of the present disclosure, the catalyst can comprise 2, 4, 6 or 8 parts by weight of the aluminium oxide. In embodiments of the present disclosure, the catalyst can comprise 2, 3 or 4 parts by weight of the sodium oxide. In embodiments of the present disclosure, the catalyst can comprise 2, 3 or 4 parts by weight of the potassium oxide.

In some embodiments, the mica is selected from at least one of muscovite mica, hydromica, bronze mica, didymite, zinnwaldite and lithium mica. In some embodiments, the zeolite is selected from at least one of echellite, stilbite, heulandite, scolecite, chabazite, mordenite and cubicite. In some embodiments, the catalyst for the thermal cracking of the thermosetting and thermoplastic organic polymers further comprises at least one of silicon dioxide, calcium oxide, aluminum oxide, ferric oxide and magnesium oxide.

It is worth noting that when the thermosetting and thermoplastic organic polymers contain fluorine and bromine, the catalyst used to thermally crack the thermosetting and thermoplastic organic polymers can also optionally comprises 1-3 parts by weight of solid base. the solid base com comprise at least one of sodium hydroxide (NaOH), sodium carbonate ($Na_2CO_3$), sodium bicarbonate ($NaHCO_3$), potassium hydroxide (KOH), potassium carbonate ($K_2CO_3$), calcium hydroxide (Ca(OH)$_2$) and calcium carbonate (CaCO$_3$). In some embodiments, the catalyst for the thermal cracking of the thermosetting and thermoplastic organic polymers further 1.5, 2.0 or 2.5 parts by weight of the solid base.

The catalyst used to thermally crack the thermosetting and thermoplastic organic polymers of the present disclosure plays an important role in the thermal cracking reaction. Specifically, through the catalytic action of the catalyst's acid radical molecule (SiO$_2$), waste tires, waste rubber, waste printed circuit boards, waste foam (polyurethane), waste medical supplies (for example, syringes, drip bags, protective clothing, gloves, etc.), waste plastics (PP, PE, PS ... ), automobile shredder residues (ASR) and other organic substances (for example, motor oil) and other organic wastes are performed with the temperature pyrolysis below 300 degrees Celsius. The initial temperature of the pyrolysis is about 205-230 degrees Celsius, and the temperature of the pyrolysis is preferably controlled at 206 degrees Celsius. The low temperature operating conditions can bring advantages such as safety, energy saving, easy maintenance, and low cost. Of course, the temperature of the pyrolysis can also be higher than 300 degrees Celsius, for example, the temperature of the efficient pyrolysis is about 350 degrees Celsius. The organic waste is thermally cracked and converted into high-quality oil (for example, no transparent colloid or viscous oil), fuel gas, coke and other clean energy. The resources after thermally cracking can be fully recycled, with extremely high economic benefits, and no secondary pollution will be produced during the thermal cracking process.

In the conventional thermal cracking method, the temperature usually reaches above 300 degrees Celsius before the thermal cracking starts. Due to the very low thermal conductivity of these wastes, the heating time is very long, the processing capacity is not easy to expand, and there is no economic benefit. However, the catalyst used to thermally crack the thermosetting and thermoplastic organic polymers of the present disclosure belongs to the natural catalyst of mica. This catalyst absorbs an electron from a long chain molecule in the thermal cracking reaction, causing the long chain molecule to form a "C+" molecule. Then, molecules with "C+" are broken into olefin molecules and new molecules with "C+". The new molecules with "C+" will continue to transfer the "+" charge to the paraffinic hydrocarbon molecules. The entire thermal cracking reaction cyclically reacts into small molecules according to the above principles and procedures. Compared with the conventional thermal cracking method, the thermal cracking reaction added with the catalyst of the present disclosure has many advantages of more chain scission times, fast reaction rate (compared to the conventional thermal cracking method, the reaction rate is increased by 60%), rich economic benefits of more than 50%, the thermal cracking temperature being lower than 300 degrees Celsius and low molecular weight of refined oil.

The following embodiments are used to describe specific aspects of the present disclosure, and enable those skilled in the art to which the present disclosure belongs to implement the present disclosure. However, the following examples should not be used to limit the present disclosure. Hereinafter, a number of comparative examples and experimental examples will be listed to verify the efficacy of the present disclosure.

Experimental example 1 and comparative example: thermal cracking of waste tires, waste thermosetting polymers and waste plastics In this experimental example, by adding the catalyst of the present disclosure, waste tires, waste thermosetting polymers (epoxy resin shells of transformers) and waste plastics are thermally cracked. In the experimental example, three catalysts are used, and each of the catalysts is 100 parts by weight. The catalyst A comprises 80 parts by weight of the mica, 3 parts by weight of the zeolite, 9 parts by weight of the titanium dioxide, 4 parts by weight of the aluminium oxide, 2 parts by weight of the sodium oxide and 2 part by weight of the potassium oxide. The catalyst B comprises 90 parts by weight of the mica, 2 parts by weight of the zeolite, 5 parts by weight of the titanium dioxide, 1 parts by weight of the aluminium oxide, 1 parts by weight of the sodium oxide and 1 part by weight of the potassium oxide. The catalyst C comprises 70 parts by weight of the mica, 3 parts by weight of the zeolite, 7 parts by weight of the titanium dioxide, 10 parts by weight of the aluminium oxide, 5 parts by weight of the sodium oxide and 5 part by weight of the potassium oxide. In the experimental example, the pyrolysis device using the catalyst which is mentioned in the following descriptions is used, and the pyrolysis method using the catalyst and/or the pyrolysis device is used to thermally crack the organic polymer. After thermally cracking, the various resources: pyro gas, pyro oil and coke (such as the aforementioned carbon residue) can all be recycled, and their proportions and components are shown in Table 1 as follows.

TABLE 1

|  | experimental example 1 | | | comparative example |
|---|---|---|---|---|
| type of waste | waste tire | thermosetting polymer | waste plastic | waste plastic |
| type of added catalyst | catalyst A | catalyst B | catalyst C | none |
| weight percentage of added catalyst weight to waste weight | 3% | 3% | 3% | — |
| first stage thermal cracking temperature | 230 degrees Celsius | 218 degrees Celsius | 206 degrees Celsius | 400 degrees Celsius |
| pryo gas (wt %) | 15 | 15 | 17 | 20 |
| pryo oil (wt %) | 43 | 82 | 80 | 76 |
| residue or coke | 42 | 3 | 3 | 4 |

TABLE 1-continued

| (wt %) annotation | experimental example 1 | | | comparative example |
|---|---|---|---|---|
| | specific gravity of pyro oil is 0.89 | specific gravity of pyro oil is 0.845 | plastic is cross-linked polyethylene (XLPE), specific gravity of pyro oil is 0.765 | plastic is cross-linked polyethylene (XLPE) |
| hydrocarbons with carbon number of 11 or less than 11 in pryo oil (counted as 100 wt %) | — | — | 84 | 35 |
| hydrocarbons with carbon number of 12 or more than 12 in pryo oil (counted as 100 wt %) | — | — | 16 | 65 |

The pyro oil in Table 1 is the initial pyro oil that has not undergone fractionation or distillation. It can be seen from Table 1 above that in the example which the waste type of the comparative example is waste plastic (XLPE), because there is no catalyst added, the thermal cracking temperature must be as high as 400 degrees Celsius; relatively. In the example which the waste type in experimental example 1 is waste plastic (XLPE), the addition of the catalyst of the present disclosure can reduce the required thermal cracking temperature to 206 degrees Celsius. In the case which the waste type of the comparative example is waste plastics (XLPE), because there is no catalyst added, the pyro oil contains only 35% of the hydrocarbons equivalent to gasoline with carbon number of 11 (C11) or less than 11; in the example which the waste type of the experimental example 1 is waste plastic (XLPE), the catalyst of the present disclosure is added to make waste organic polymers more capable of producing small molecules of hydrocarbons during the thermal cracking (pyrolysis) process, so the pyro oil contains 84% of the hydrocarbons equivalent to gasoline with carbon number of 11 (C11) or less than 11, with high purity quality. In other words, using the catalyst can perform thermal cracking reaction at a temperature lower than 300 degrees Celsius, and the produced initial pyro oil that has not undergone fractionation or distillation has excellent purity quality. Even, the produced pyro gas accounted for 17%, the initial pyro oil accounted for 80%, and the coke accounted for 3%. Therefore, obviously using the catalyst to perform the thermal cracking reaction at a temperature below 300 degrees Celsius, the initial produced clean energy yield is as high as 97% (the sum of 17% of pyro gas and 80% of initial pyro oil). Since coke only accounts for 3%, secondary pollution is reduced.

Therefore, the addition of the catalyst of the present disclosure can reduce the required thermal cracking temperature of waste organic polymers to less than 300 degrees Celsius during the thermal cracking process, and is more capable of producing small-molecule hydrocarbon products. The low thermal cracking temperature helps to save energy, and the output of more small molecule hydrocarbons can be used as high calorific value gasoline.

Experimental example 2: the above-mentioned pyro oil is subjected to ASTM D2887 gas chromatography simulated distillation (GC SIM-DIS) method to analyze the distillation temperature, and the results are as follows in Table 2.

TABLE 2

| GC SIM-DIS | boiling point of pyro oil from waste tires (degrees Celsius) | boiling point of pyro oil of waste thermosetting polymers (degrees Celsius) | boiling point of pyro oil of waste plastics (degrees Celsius) |
|---|---|---|---|
| initial boiling point (IBP) (%) | <36 | <44 | <30 |
| 5% | 77.5 | 85.0 | 41.5 |
| 10% | 106.0 | 112.0 | 48.1 |
| 20% | 128.5 | 167.0 | 54.9 |
| 30% | 144.0 | 170.0 | 65.6 |
| 40% | 168.0 | 171.5 | 78.0 |
| 50% | 179.5 | 192.5 | 107.5 |
| 60% | 206.5 | 218.5 | 129.0 |
| 70% | 244.0 | 246.0 | 144.5 |
| 80% | 289.5 | 305.0 | 164.0 |
| 90% | 377.0 | 383.5 | 178.5 |
| 99% | 436.0 | 447.5 | 207.0 |
| final boiling point (FBP) | 521.0 | 530.5 | 366.5 |

It can be seen from Table 2 above that the proportion of solvent components (IBP<179.5 degrees Celsius) of the pyro oil in waste tire reaches 50%; the proportion of kerosene components (179.5 degrees Celsius<IBP<244.0 degrees Celsius) reaches 20% (70% minus 50%); the proportion of diesel fuel (244.0 degrees Celsius<IBP<436 degrees Celsius) is 29%. In addition, the high-quality pyro oil of waste plastics in this experimental example has a gasoline (octane number 47) composition ratio of up to 84%, and a pyro gas ratio of 16%. Both of the above can be sold and applied as "clean (renewable) energy"; however, the present disclosure aims to operate as a "vein industry" and "green power plant" energy. This target has the added value of "Carbon Emission Reduction (CDM)" and "Carbon Footprint", and meets the RE100 requirements regulated by The Climate Group (The Climate Group) and the Carbon Disclosure Project (CDP).

Another one objective of the present disclosure is to provide a pyrolysis device. Specifically, the pyrolysis device is suitable for thermal cracking of waste organic polymers in waste circuit boards, transformers, converters, polarizers, solar panels and high-voltage power cables. For the convenience of descriptions, the pyrolysis device will be described and illustrated as a kind of a treatment device for thermally cracking the waste organic polymers and waste solar panels.

Figure 2:
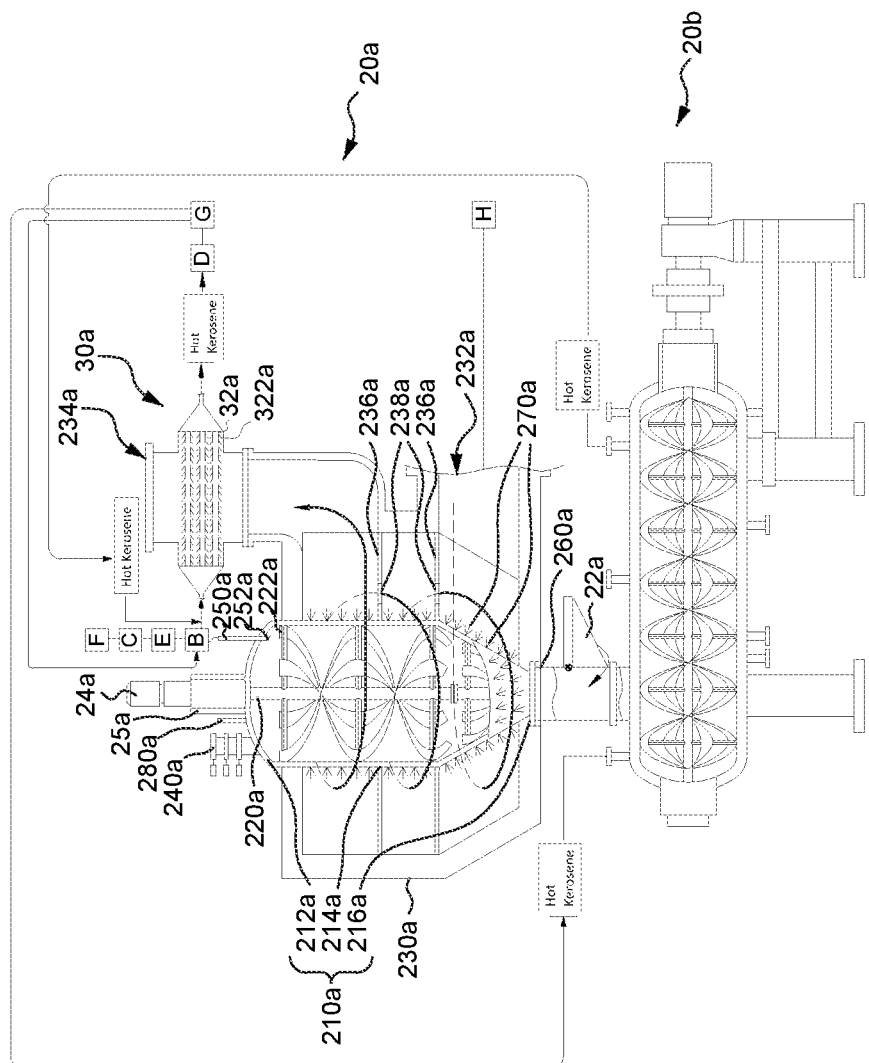
FIG. 2 is a sectional view showing a structure of a cracking furnace according to an embodiment of the present disclosure.

Therefore, those with ordinary skill in the art of the technical field of the present disclosure can recognize the treatment device for thermally cracking the waste organic polymers and waste solar panels refers to the pyrolysis device of the present disclosure. FIG. 1 is a flow chart of operation of a pyrolysis device (a treatment device for thermally cracking the waste organic polymers and waste solar panels) according to an embodiment of the present disclosure. FIG. 2 is a sectional view showing a structure of a cracking furnace according to an embodiment of the present disclosure. Refer to FIG. 1 and FIG. 2 at the same time, and the pyrolysis device of the present disclosure comprises a cracking furnace A. Specifically, The cracking furnace A includes a vertical thermal cracking main furnace 20a and a horizontal semi-synchronous thermal cracking auxiliary furnace 20b. The vertical thermal cracking main furnace 20a comprises a furnace body 210a, an agitator shaft 220a, a thermal jacket 230a, a charge port 240a, an exhaust vent 250a and a discharge port 260a. In more detail, the furnace body 210a has a furnace roof 212a, a furnace bottom 216a and a furnace wall 214a. It should be noted that the cracking furnace A is a cracking furnace which is capable of crushing.

The agitator shaft 220a is vertically inserted in the furnace body 210a, and the agitator shaft 220a is provided with a plurality of agitator sheets 222a. In embodiments of the present disclosure, the agitator sheet 222a may include a forward rotation agitator sheet and a reverse rotation agitator sheet alternately arranged. The agitator shaft 220a and the agitator sheet 222a are driven to rotate by a motor 24a installed outside the furnace. This design can fully stir the waste in the furnace body 210a at a moderate speed, so that the waste can be heated evenly and thermal cracking reaction can occur at the same time. This design can also avoid the generation of different reaction mechanisms due to waste (for example, rubber) with low thermal conductivity, thereby obtaining better pyro gas quality and better pyrol oil quality. In embodiments of the present disclosure, the motor 24a is also covered with a heat insulation layer 25a to prevent the motor 24a from being damaged by the heat of the thermal jacket 230a.

The thermal jacket 230a is arranged on the outside of the furnace wall 214a. More specifically, the thermal jacket 230a covers the outer wall of the vertical thermal cracking main furnace 20a. In embodiments of the present disclosure, the thermal jacket 230a comprises a hot air inlet 232a, a hot air outlet 234a, a plurality of spacer plates 236a and a plurality of vents 238a. These spacer plates 236a are arranged at intervals between the hot air inlet 232a and the hot air outlet 234a, and these vents 238a are respectively arranged on the spacer plates 236a. This design can make the hot gas stay longer in the thermal jacket 230a to increase the efficiency of heat energy use. For example, the hot air enters the hot air inlet 232a and then rotates upward along the outer wall of the vertical thermal cracking main furnace 20a from bottom of the thermal jacket 230a. Of course, the spacer plate 236a can be a spiral spacer plate, in this case the number of the spacer plate 236a can be one, and the vents 238a need not be provided. The spiral channel formed by the spiral spacer plate guides the hot air, so that the hot air stays in the thermal jacket 230a for a longer time, so as to increase the efficiency of heat energy use, and heat the vertical thermal cracking main furnace 20a uniformly without local overheating.

In some embodiments, the vertical thermal cracking main furnace 20a further comprises a plurality of heat conduction components 270a arranged between the thermal jacket 230a and the furnace wall 214a. More specifically, each heat conduction component 270a is composed of multiple heat conduction fins. For example, the number of thermally conductive fins as shown in FIG. 2 is three, but it is not limited thereto. In other examples, the number of thermally conductive fins may be 2, 4, 5, 6, or etc. The setting of the heat conduction component 270a can increase the heat conduction area to improve the efficiency that the hot air transfers heat to the vertical thermal cracking main furnace 20a.

Figure 3:
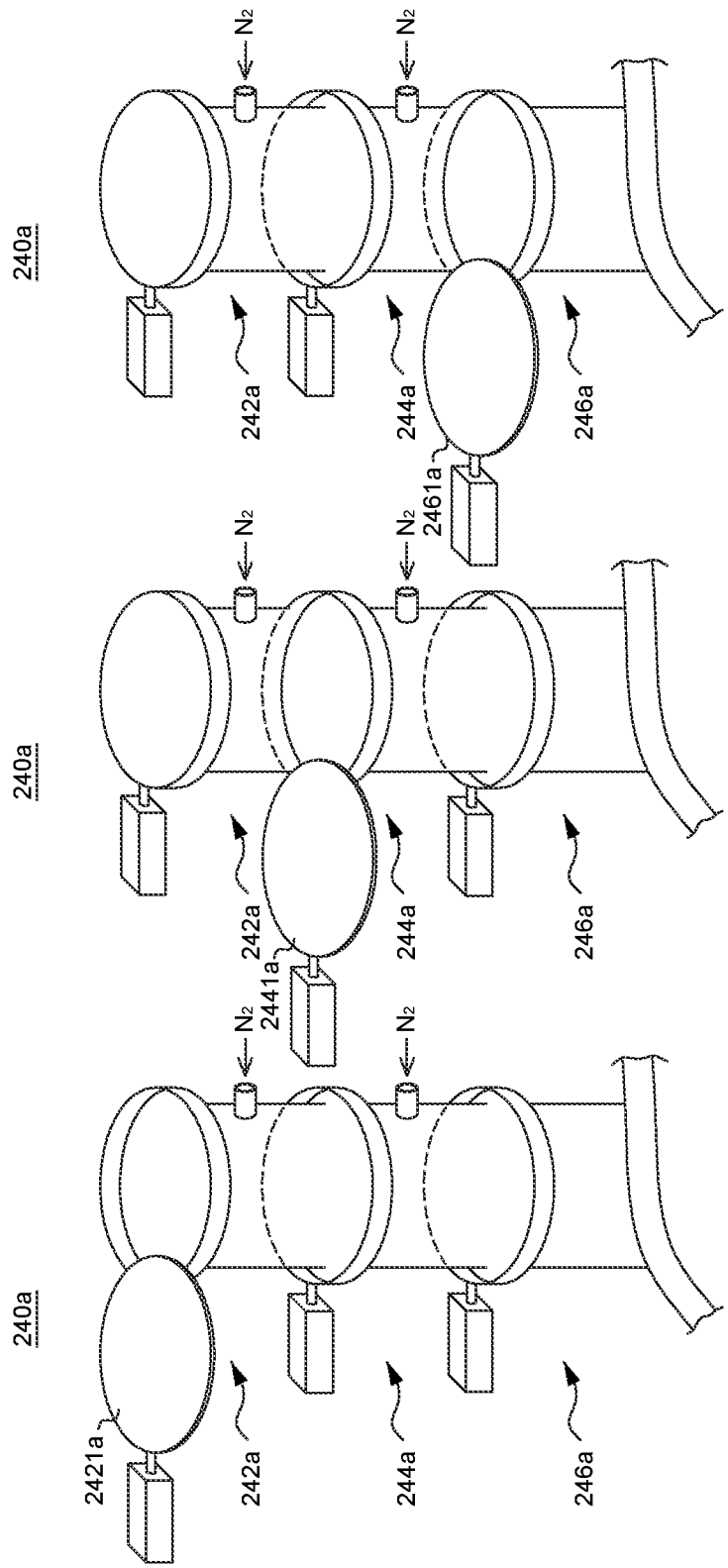
FIG. 3A, FIG. 3B and FIG. 3C are three dimensional views showing a structure of a charge port of a vertical thermal cracking main furnace according to an embodiment of the present disclosure.

The charge port 240a is disposed on the furnace roof 212a. FIG. 3A, FIG. 3B and FIG. 3 are three dimensional views showing a structure of a charge port of a vertical thermal cracking main furnace according to an embodiment of the present disclosure. Refer to FIG. 3A, FIG. 3B and FIG. 3C, and in embodiments of the present disclosure, the charge port 240a comprises a first stage charge port 242a, a second stage charge port 244a and a third stage charge port 246a. Specifically, the first stage charge port 242a has a first knife gate 2421a (only shown in FIG. 3A for clarity), the second stage charge port 244a has a second knife gate 2441a (only shown in FIG. 3B for clarity), and the third The stage charge port 246a has a third knife gate 2461a (only shown in FIG. 3C for clarity). It is worth noting that when the first knife gate 2421a is opened, the second knife gate 2441a and the third knife gate 2461a are closed; when the second knife gate 2441a is opened, the first knife gate 2421a and the third knife gate 2461a are closed; and when the third knife gate 2461a is opened, the first knife gate 2421a and second knife gate 2441a are closed. In other words, the first stage charge port 242a, the second stage charge port 244a and the third stage charge port 246a of the charge port 240a are cross-closed. Therefore, the waste will sequentially pass the first stage charge port 242a, second stage charge port 242a and the third stage charge port 246a of the charge port 240a to fall into the furnace body 210a. In embodiments of the present disclosure, nitrogen gas can be injected into charge port 240a to prevent air from entering; or alternatively, nitrogen gas is injected from the nitrogen inlet between the first knife gate 2421a and second knife gate 2441a; or alternatively, nitrogen gas is injected from the nitrogen injection inlet between the second knife gate 2441a and the third knife gate 2461a. This design is in response to the "anaerobic thermal cracking process", which is not only safe but can also produce high-purity pyro gas.

The exhaust vent 250a is installed on the furnace roof 212a. Please return to FIG. 2, and in the present disclosure, the exhaust vent 250a has a baffle 252a extending into the furnace body 210a and the baffle 252a is substantially parallel to the furnace roof 212a. This design can block most of the dust to be discharged from the exhaust vent 250a in advance to reduce the burden of subsequent processing tanks. In one embodiment, the baffle 252a is an arc-shaped baffle. It should be noted that the exhaust vent 250a does not have a shut-off valve. When the heating of the furnace body 210a is accidentally stopped, for example, a sudden power failure causes the heating of the furnace body 210a to stop, the residual heat of the furnace body 210a will cause the organic polymers to continue to produce pyro gas and generate a slightly positive pressure. The exhaust vent 250a of the present disclosure does not have a shut-off valve to allow the pyro gas to be discharged without obstacles. Therefore, compared with the conventional closed cracking furnace, the present disclosure can prevent the danger of explosion of the furnace body 210a.

The discharge port 260a is provided on the furnace bottom 216a. The horizontal semi-synchronous thermal cracking auxiliary furnace 20b is connected to the discharge port 260a of the vertical thermal cracking main furnace 20a. Generally speaking, the vertical thermal cracking main furnace 20a cannot completely crack all the waste in a short time (for example, 2-4 hours). Therefore, the solid entering the horizontal semi-synchronous thermal cracking auxiliary furnace 20b from the discharge port 260a also contains a part of the solid waste being not thermally cracked. The waste that has not been thermally cracked will continue to be thermally cracked by the horizontal semi-synchronous thermal cracking auxiliary furnace 20b. It can be seen that the horizontal semi-synchronous thermal cracking auxiliary furnace 20b and the vertical thermal cracking main furnace 20a perform thermal cracking reaction synchronously to increase the thermal cracking efficiency.

In embodiments of the present disclosure, the treatment device for waste solar panels and the waste organic polymers also comprises a rocker switch 22a. The rocker switch 22a is set between the discharge port 260a of the vertical thermal cracking main furnace 20a and the horizontal semi-synchronous thermal cracking auxiliary furnace 20b. When the cracking furnaces 20a and 20b perform the thermal cracking reaction, the rocker switch 22a is in a closed state. After a batch of the thermal cracking is completed, the rocker switch 22a is turned on to allow the solid residue and the untracked waste which are completely treated by the vertical thermal cracking main furnace 20a to enter the horizontal semi-synchronous thermal cracking auxiliary furnace 20b. Then, turn off the rocker switch 22a again, let the next batch of waste fall into the vertical thermal cracking main furnace 20a, the vertical thermal cracking main furnace 20a and the horizontal semi-synchronous thermal cracking auxiliary furnace 20b continue to perform the thermal cracking reaction synchronously.

It should be noted that, different from the conventional design of "rotary kiln" and "horizontal furnace", the cracking furnace of the present disclosure is designed with the "pyro gas outlet" facing up and the "solid outlet" facing down to prevent the furnace from being shut down due to an accident (for example, power outage, earthquake, etc.) or blocked due to incomplete thermal cracking (for example, a damp mass) during normal operation, thereby avoiding industrial accidents. It should be emphasized that the inside of the vertical thermal cracking main furnace 20a of the present disclosure must maintain a "slightly positive pressure". In other words, during the thermal cracking process of the vertical thermal cracking main furnace 20a of the present disclosure, the interior of the vertical thermal cracking main furnace 20a must maintain a "slightly positive pressure" so that the pyro gas can be discharged without obstacles and it prevents the explosion risk of the thermal cracking main furnace 20a.

In embodiments of the present disclosure, after a batch of thermal cracking reaction is completed, the solid residue remaining in the horizontal semi-synchronous thermal cracking auxiliary furnace 20b will be placed in a solid cooling tank for cooling, and after cooling, a one-time treatment is performed. For example, a water shaker can be used for the one-time treatment. The flake glass fiber after the one-time treatment will be sorted out, and can be made into rust remover after being re-utilized. After the flake glass fibers are sorted out, the remaining solid residues can be sequentially subjected to smelting, anode furnace refining and electrolytic refining, or in sequence subjected to secondary grinding (for example, impact mill), gravity separation and electrostatic sorting for dividing of precious metals and non-metals. The types of precious metals can be further subdivided by gravity method, specific gravity method and dissolution method.

In embodiments of the present disclosure, the treatment device for the waste organic polymers and the waste solar panels also comprises a heat exchanger 30a. The heat exchanger 30a is connected to the hot air outlet 234a of the thermal jacket 230a. Specifically, the heat exchanger 30a includes a plurality of fuel tubes 32a, and each fuel tube 32a is provided with a plurality of heat conduction wafers 322a on the outer wall thereof. The higher the thermal conductivity of the heat conduction wafer 322a is, the higher the efficiency of heat exchange is. The heat exchanger 30a uses hot kerosene to exchange heat with hot air.

In embodiments of the present disclosure, treatment device for the waste organic polymers and the waste solar panels also includes an expansion tank D. The expansion tank D is connected to the working fluid outlet of heat exchanger 30a. In one embodiment, a certain pressure can be applied to expansion tank D to keep the liquid phase operation. The expansion tank D has the following important functions in the thermal kerosene circulation system: (1) storage of the expansion after heating; (2) supplement of hot kerosene; (3) discharging gas from the liquid phase furnace and system during heating; and (4) replacing the heating medium with the cool oil in the furnace when power failure. The setting of expansion tank D is beneficial to extend the life of hot kerosene, and indirectly protects heater and other equipment parts. The liquid outlet of the expansion tank D is connected to the kerosene heater G. The kerosene heater G heats the heat hot kerosene and transports the hot kerosene to the thermal cracking auxiliary furnace 20b and the initial separation tank B described later.

Figure 4:
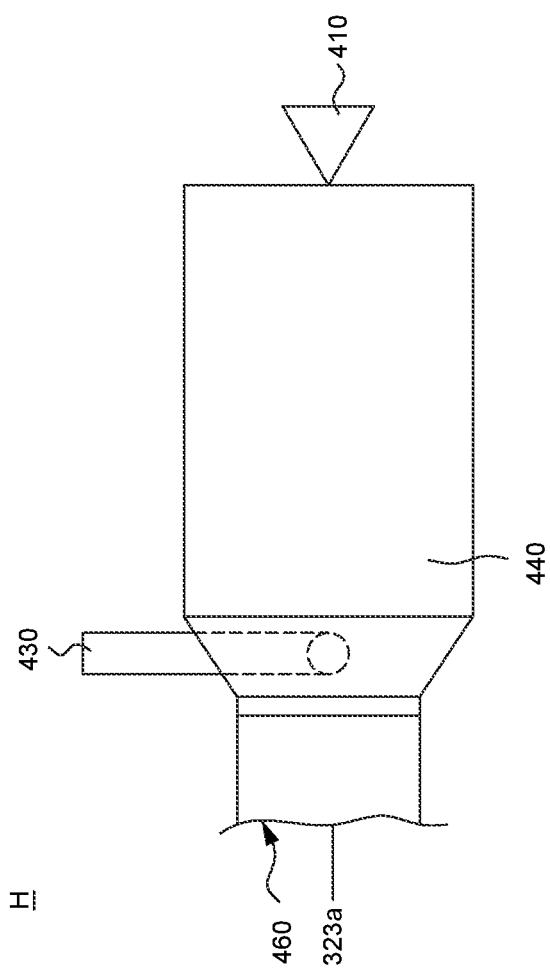
FIG. 4 is a sectional view showing a structure of a heater according to an embodiment of the present disclosure.

In embodiments of the present disclosure, the treatment device for the waste organic polymers and the waste solar panels also contains a heater H. The heater H is connected to the hot air inlet 232a of the thermal jacket 230a. Please refer to FIG. 4 for the specific structure of heater H. FIG. 4 is a schematic cross-sectional view of the structure of heate rH according to an embodiment of the present disclosure. The heater H includes a heating source 410, an emergency switch 430 and a hot air outlet 460. Specifically, the heater H contains gas 440 that can be heated. Refer to FIG. 2 and FIG. 4 at the same time, the gas 440 is heated by the heating source 410 (fuel gas burner), and the heated gas 440 is output from hot air outlet 460 to hot air inlet 232a of thermal jacket 230a. For example, the temperature of the heated gas 440 is not less than 320 degrees Celsius to avoid corrosion of sulfides.

Figure 5:
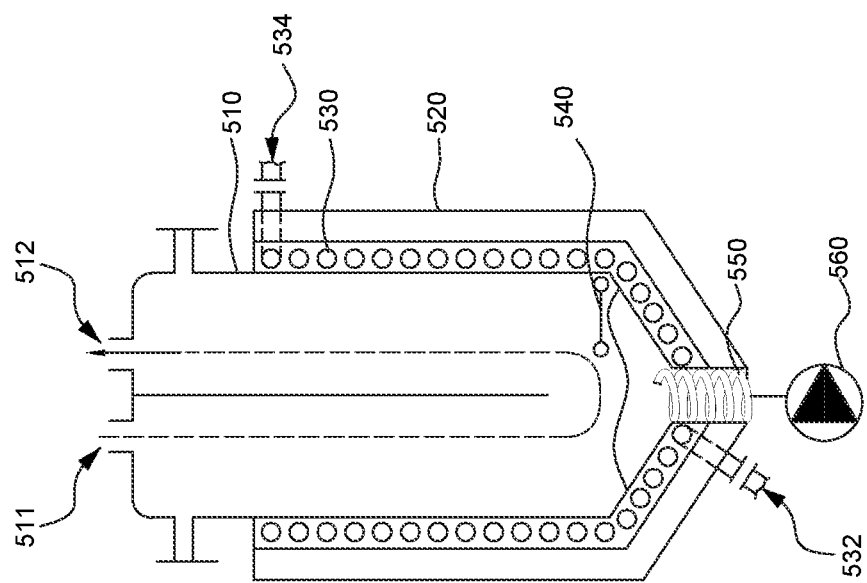
FIG. 5 is a sectional view showing a structure of an initial separation tank according to an embodiment of the present disclosure.

In embodiments of the present disclosure, the treatment device for the waste organic polymers and the waste solar panels also includes an initial separation tank B. The initial separation tank B is connected to the exhaust vent 234a of the vertical thermal cracking main furnace 20a. Please refer to FIG. 5 for the specific structure of the initial separation tank B. FIG. 5 is a sectional view showing a structure of an initial separation tank according to an embodiment of the present disclosure. The outer side of the tank body 510 of the initial separation tank B is covered with a thermal insulation jacket 520, and a hot kerosene recycling tube 530 is provided between the outer side of the tank body 510 and the thermal insulation jacket 520. The setting of the thermal insulation jacket 520 is to avoid the phenomenon of liquid-gas separation caused by the pyro gas in the initial separation tank B. The hot kerosene enters from the inlet 532 of the hot kerosene recycling tube 530, and then flows out from the outlet 534. Refer to FIG. 2 and FIG. 5 at the same time, in order to make the hot kerosene reusable, the outlet 534 is connected to heat exchanger 30a. Please go back to FIG. 5, the pyro gas enters from the gas inlet 511 and exits from the gas outlet 512. In this process, the dust entrained by pyro gas will be taken away by water and stay at the bottom of tank body 510 to form the oil sludge. The bottom of the tank body 510 has a spiral delivery tube 550 and a pump 560 connected to the spiral delivery tube. When the oil sludge level is higher than that of the liquid level controller 540, the pump 560 will be driven to extract the oil sludge from the spiral delivery tube 550. In one embodiment, the oil sludge extracted from the initial separation tank B can be transported to the vertical thermal cracking main furnace 20a for secondary thermal cracking. The setting of the initial separation tank B is mainly to remove dust from the pyro gas. In particular, the pyro gas channel formed by the vertical thermal cracking main furnace 20a, the exhaust vent 250a, the initial separation tank B and the gas outlet 512 through which the pyro gas of the present disclosure passes is not provided with a shut-off valve, which allows the pyro gas to be discharged without obstacles. Therefore, the risk of explosion can be prevented. In addition, during the process of the thermal cracking, the pyro gas in the pyro gas channel presents a slightly positive pressure.

In embodiments of the present disclosure, the treatment device for the waste organic polymers and the waste solar panels also includes a condenser E. The condenser E is connected to the initial separation tank B. The setting of condenser E is mainly to separate the pyro gas from gas (such as, fuel gas) and liquid (such as, gasoline), i.e. performing gas-liquid separation. The following pyrolysis method will describe functions of a first condenser (not shown in the drawings) and a second condenser (not shown in the drawings) of the condenser E, in detail.

Figure 6:
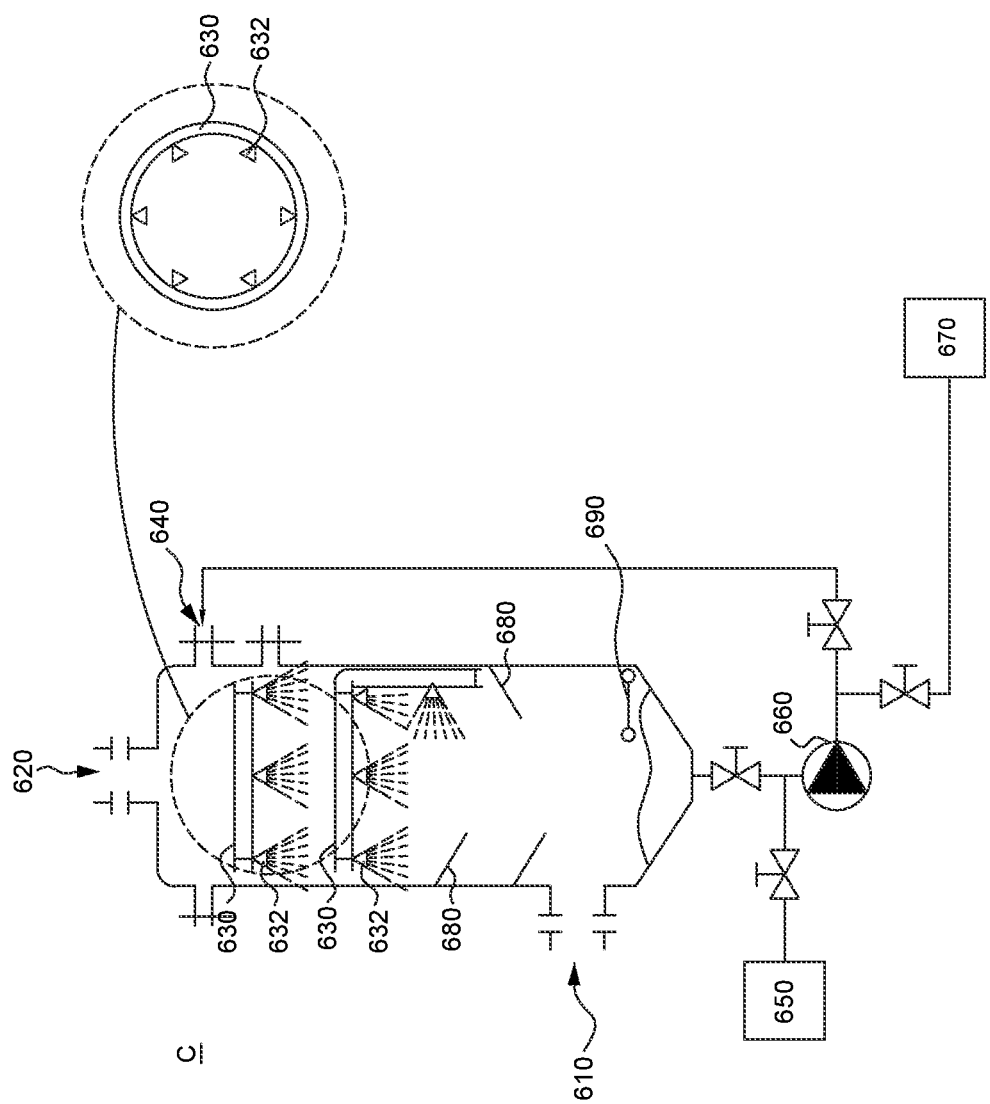
FIG. 6 is a sectional view showing a structure of a halide recycling device according to an embodiment of the present disclosure.

In embodiments of the present disclosure, the treatment device for the waste organic polymers and the waste solar panels also includes a halide recycling device C. The halide recycling device C is connected to the condenser E. Refer to FIG. 6 for the specific structure of halide recycling device C. FIG. 6 is a sectional view showing a structure of a halide recycling device according to an embodiment of the present disclosure. The halide recycling device C is provided with one or more circular tubes 630 arranged at intervals from top to bottom near the top, and multiple nozzles 632 are at intervals disposed on the circular tube 63. Of course, a vertical tube extending downward from the circular tube 630 can also be provided, and a plurality of nozzles are also provided on the vertical tube at intervals. The halide recycling device C also contains a captured halogen solvent replenisher tank 650, which can pump the captured halogen solvent from the liquid inlet 640 into the circular tube 630 by using the pump 660. The gas inlet 610 is arranged adjacent to the bottom of the halide recycling device C, and the gas outlet 620 is arranged adjacent to the top of the halide recycling device C. The inner wall of the halide recycling device C is also provided with multiple baffles 680 to increase the path of the pyro gas. When the pyro gas enters the halide recycling device C from the gas inlet 610 and flows upwards along the baffle 680, the nozzle 632 sprays out the captured halogen solvent to take away the halogen in the pyro gas. The remaining clean pyro gas leaves the gas outlet 620, and the halide is dissolved in the captured halogen solvent which accumulates at the bottom of the halide recycling device C. The halide recycling device C also contains a liquid level controller 690. When the liquid level of the solution accumulated at the bottom of the halide recycling device C is too high, the pump 660 will pump the liquid from the bottom of the halide recycling device C to the processing tank 670 for additional processing. The halide recycling device C is the second halogen capture mechanism among the three halogen capture mechanisms of the present disclosure.

In embodiments of the present disclosure, the treatment device for the waste organic polymers and the waste solar panels also includes an air storage tank F. The air storage tank F is connected to the halide recycling device C. The air storage tank F is used to store high-purity fuel gas. In particular, the pyro gas channel formed by the vertical thermal cracking main furnace 20a, the exhaust vent 250a, the initial separation tank B, the gas outlet 512, the condenser E and the halide recycling device C through which the pyro gas of the present disclosure sequentially passes is not provided with a shut-off valve. The pyro gas can be discharged without obstacles, so the danger of explosion can be prevented. In addition, during the process of thermal cracking, the pyro gas in the pyro gas channel has a slightly positive pressure.

The treatment device for the waste organic polymers and the waste solar panels of the present disclosure provides various advantages, but these advantages are not intended to limit the present disclosure. For example, the treatment device of the present disclosure has the following advantages: (1) no additional pollutants harmful to the environment will be discharged; (2) hot kerosene is recycled in multiple devices; (3) the efficiency of thermal cracking is improved; 4) generate extremely high-purity pyro gas (for example, fuel gas), pyro oil (for example, gasoline, etc.) and refined carbon; and (5) the energy demand of the device is low.

Another objective of the present disclosure is to provide a pyrolysis method. Further, the pyrolysis method is suitable for thermally cracking waste organic polymers in waste printed circuit boards, transformers, converters, polarizers, solar panels and high-voltage power cables. For the convenience of descriptions, the pyrolysis method will be described and illustrated as a treatment method for the waste organic polymers and the waste solar panels. Therefore, those with ordinary skill in the art of the technical field of the present disclosure can recognize the treatment method for the waste organic polymers and the waste solar panels refers to the pyrolysis method. It should be understood that additional operations can be performed before, during, and after this method, and for additional embodiments of this method, some of the operations can be replaced, eliminated or moved. This method is only an exemplary embodiment, and is not intended to limit the various embodiments of the present disclosure, except for those clearly stated in the scope of the claims. This method includes the following steps. Please refer to FIG. 1 and FIG. 2. First, put the waste and the catalyst used to thermally crack the thermosetting and thermoplastic organic polymers as described above in the treatment device for the waste organic polymers and the waste solar panels as described above. A thermal cracking reaction is carried out in the cracking furnace A to generate the first stage pyro gas containing halogen gas. The waste described herein includes the thermosetting polymers, thermoplastic polymers, waste polarizers, waste solar panels, or combinations thereof. It should be noted that since catalyst is added to cracking furnace A, the temperature of the thermal cracking reaction is about 205-230 degrees Celsius, preferably 206 degrees Celsius. Of course, the temperature of the thermal cracking reaction can also be higher than 300 degrees Celsius, for example, the efficient thermal cracking temperature is about 350-380 degrees Celsius, and for example, 360 degrees Celsius.

It is understandable that the polarizer needs to be added with iodine due to functional problems to achieve its purpose. Incineration will face the problem of air pollution caused by combustion to produce toxic iodide flue gas and acidic substances, and thus the polarizer cannot be directly incinerated. The back sheet in the solar panel is a polyvinyl fluoride composite film, which also produces fluoride during the conventional processing of waste solar panels, and the fluoride is the source of the greenhouse effect. In addition, the flame retardant of waste printed circuit boards is usually added with bromine, which will also pollute the environment due to the generation of bromide in the conventional disposal of the waste printed circuit board.

In embodiments of the present disclosure, before the waste is placed in the cracking furnace A for thermal cracking reaction, the waste is pre-treated. For example, the pre-treatment is to use a crusher, a vibrating screen and/or a waste plastic bag granulator to process the waste to form small pieces of about 3 inches, thereby increasing the throughput of the thermal cracking. In the present disclosure, the catalyst used to thermally crack the thermosetting and thermoplastic organic polymers enters from the catalyst inlet 280*a* of cracking furnace A, but not from the charge port 240*a*. It should be noted again that the crushed waste enters the cracking furnace A in sections through the first stage, the second stage and the third stage charge ports 242*a*, 244*a*, 246*a* (shown in FIG. 3A, FIG. 3B and FIG. 3C) of the charge port 240*a*. In particular, because the catalyst of the present disclosure enables the organic polymers to produce thermal cracking reaction at a low temperature of about 205-230 degrees Celsius, the waste does not require pre-treatment water to clean the organic or inorganic contaminants on the waste. The present disclosure will not have the problem of waste water generation and waste water treatment.

Next, the first stage pyro gas containing the halogen gas is discharged from the exhaust vent 250*a* of the cracking furnace A.

Then, the first stage pyro gas is discharged through the exhaust vent 250*a*, and then enters the initial separation tank B to remove the dust in the first stage pyro gas to generate a second stage pyro gas containing the halogen gas. Since the function of the initial separation tank B is to remove dust, the temperature of the initial separation tank B is controlled to be greater than 350 degrees Celsius to avoid the generation of liquid oil.

Next, the second stage pyro gas enters the first condenser E of the aforementioned condenser E for gas-liquid separation to generate a third stage pyro gas containing the halogen gas and a first stage pyro oil. It is worth noting that the temperature of the first condenser is 80-120 degrees Celsius. In embodiments of the present disclosure, the temperature of the first condenser may be 85, 90, 95, 100, 105, 110, or 115 degrees Celsius. In this step, the function of the first condenser is to liquefy the oil and gas carried by the first stage pyro gas, and the halogen gas molecules are separated with the pyro gas by the subsequent halide recycling device. In embodiments of the present disclosure, a temperature controller can be used to control the temperature of the first condenser to be greater than the vaporization point of the halogen and less than the vaporization point of the oil. For example, the vaporization point of fluorine is about −188 degrees Celsius, the vaporization point of bromine is about 58.8 degrees Celsius, and the vaporization point of the oil is about 180-230 degrees Celsius.

In some embodiments, the first stage pyro oil is cooled by the second condenser to generate the second stage pyro oil. It should be noted here that the function of the second condenser is only to lower the first stage pyro oil of about 80-120 degrees Celsius to the room temperature. Next, put the second stage pyro oil at room temperature into a regenerative energy oil tank and let it stand still to make oil-water separation. Since a very small amount of halogen soluble in water has formed a very weakly acidic hydrogen halide aqueous solution at this stage, it is possible that after the first condenser performs the gas-liquid separation, the acidic hydrogen halide aqueous solution accompanying with the pyro oil will enter the second condenser and regenerative energy oil tank with. At this time, the second stage pyro oil contains 90% of light oil (or naphtha). Since light oil has a specific gravity of 0.75-0.85, it is stratified above the water. In embodiments of the present disclosure, the aqueous solution in the lower layer of the regenerative energy oil tank can be led out for processing, and the halogen soluble in water can also be captured and processed; and the remaining light oil can be processed through multiple processes to generate fuel oil, gasoline, liquefied petroleum gas or petrochemical raw materials, etc., for outsole or cogeneration. Using the principle of pyro oil and water stratifying, the halogen soluble in water is captured and extracted for treatment, which is the third halogen capture mechanism among the three halogen capture mechanisms of the present disclosure. As mentioned earlier, the first halogen capture mechanism is the use of sodium oxides and potassium oxides in the catalyst, and the second halogen capture mechanism is the halide recycling device C.

Then, the third stage pyro gas containing the halogen gas is allowed to enter the halide recycling device C to generate the fuel gas and the halide, wherein the halide recycling device contains the captured halogen solvent. The captured halogen solvent can take away the halogen in the third stage pyro gas.

In embodiments of the present disclosure, the captured halogen solvent may be an aqueous solution containing potassium ($K^+$), an aqueous solution containing sodium ($Na^+$), or an aqueous solution containing calcium ($Ca^{2+}$). For example, the potassium ($K^+$) aqueous solution includes potassium nitrate ($KNO_3$) aqueous solution. The sodium ($Na^+$) aqueous solution includes hydrogen sodium oxides (NaOH) aqueous solution, sodium carbonate ($Na_2CO_3$) aqueous solution, sodium bicarbonate ($NaHCO_3$) aqueous solution, sodium sulfate ($Na_2SO_4$) aqueous solution, sodium hydrogen sulfate ($NaHSO_4$) aqueous solution and sodium sulfite ($Na_2SO_3$) aqueous solution. The calcium ($Ca^{2+}$) aqueous solution includes calcium carbonate ($CaCO_3$) aqueous solution. In many embodiments, $X^-+Na^+\rightarrow NaX$; $X^-+K^+\rightarrow KX$; $2X^-+Ca^{2+}\rightarrow CaX_2$.

The treatment method for the waste organic polymers and the waste solar panels of the present disclosure provides various advantages, but these advantages are not intended to limit the present disclosure. For example, compared with conventional combustion or burial, the treatment method of the present disclosure has a lower thermal cracking temperature and discharges less waste water, and the treatment method of the present disclosure can prevent the halide from being discharged to pollute the environment.

Figure 7:
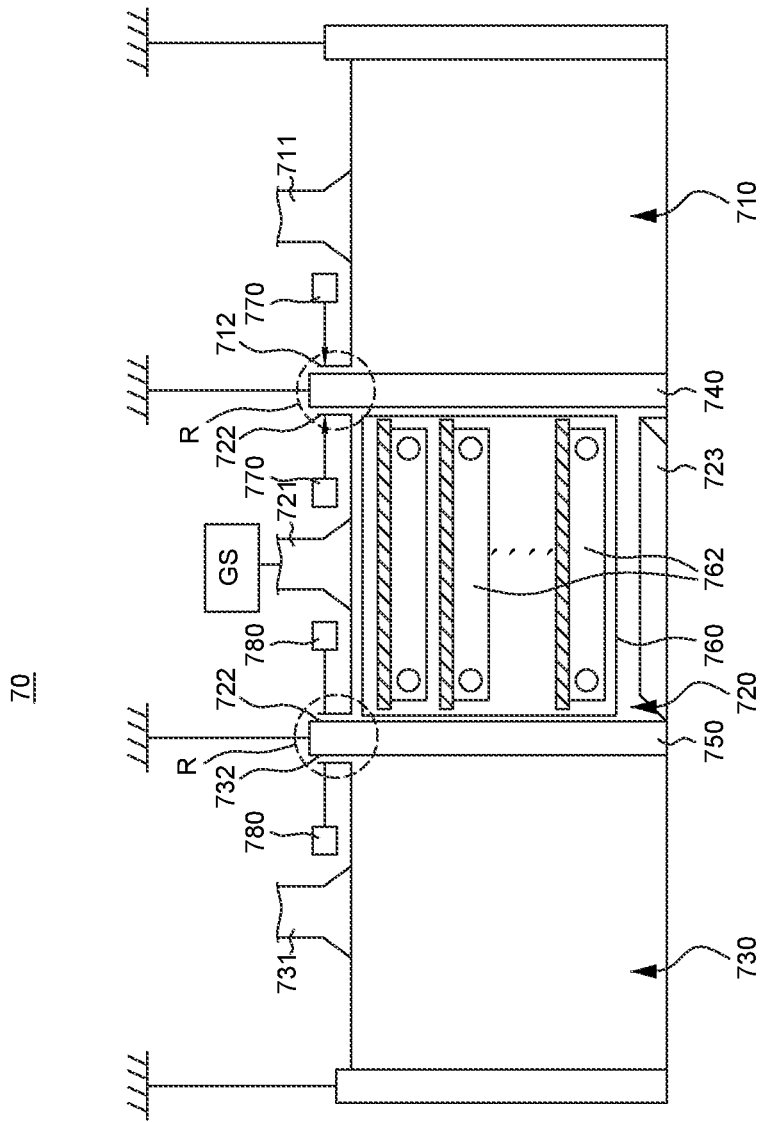
FIG. 7 is a sectional view showing a structure of a pyrolysis device according to an embodiment of the present disclosure.

Another one objective of the present disclosure is to provide a pyrolysis device. Specifically, the pyrolysis device is suitable for thermal cracking of waste organic polymers in waste circuit boards, transformers, converters, polarizers, solar panels and high-voltage power cables. For the convenience of descriptions, the pyrolysis device will be described and illustrated as a kind of a treatment device for thermally cracking the waste organic polymers and waste solar panels. Therefore, those with ordinary skill in the art of the technical field of the present disclosure can recognize the treatment device for thermally cracking the waste organic polymers and waste solar panels refers to the pyrolysis device of the present disclosure. FIG. 7 is a sectional view showing a structure of a treatment device for waste organic polymers and waste solar panels (a pyrolysis device) according to an embodiment of the present disclosure. The treatment device 70 for the waste solar panels comprises a charge chamber 710, a pyrolysis chamber 720, a resting chamber 730, a first gate 740, a second gate 750 and a disk transport device 760.

As shown in FIG. 7, the pyrolysis chamber 720 is located between the charge chamber 710 and the resting chamber 730. In embodiments of the present disclosure, the charge chamber 710 includes an exhaust vent 711 located in the ceiling of the charge chamber 710. In embodiments of the present disclosure, the charge chamber 710 has a wing plate 712 surrounding the outer wall of the charge chamber 710.

As shown in FIG. 7, in embodiments of the present disclosure, the pyrolysis chamber 720 includes an exhaust vent 721 and a slag discharge port 722. The exhaust vent 721 is located at the ceiling of the pyrolysis chamber 720 and the slag discharge port 723 is located at the bottom of the pyrolysis chamber 720. In embodiments of the present disclosure, the pyrolysis chamber 720 has a wing plate 722 surrounding the outer wall of the pyrolysis chamber 720.

As shown in FIG. 7, in embodiments of the present disclosure, the resting chamber 730 includes an exhaust vent 731 located on the ceiling of the resting chamber 730. In embodiments of the present disclosure, the resting chamber 730 has a wing plate 732 surrounding the outer wall of the resting chamber 730.

As shown in FIG. 7, the first gate 740 is arranged between the charge chamber 710 and the pyrolysis chamber 720, and can rise or descend between the charge chamber 710 and the pyrolysis chamber 720. In embodiments of the present disclosure, and the first gate 740 is arranged between the wing plate 712 and the wing plate 722, and can rise or descend between the wing plate 712 and the wing plate 722. In embodiments of the present disclosure, the treatment device for waste solar panels 70 further includes a pressure imposing element 770 for sealing the wing plate 712, the first gate 740 and the wing plate 722.

As shown in FIG. 7, the second gate 750 is arranged between the pyrolysis chamber 720 and the resting chamber 730, and can rise or descend between the pyrolysis chamber 720 and the resting chamber 730. In embodiments of the present disclosure, the second gate 750 is arranged between the wing plate 722 and the wing plate 732, and can rise or descend between the wing plate 722 and the wing plate 732. In embodiments of the present disclosure, the treatment device for the waste solar panels 70 further includes a pressure imposing element 780 for sealing the wing plate 722, the second gate 750 and the wing plate 732.

Figure 9B:
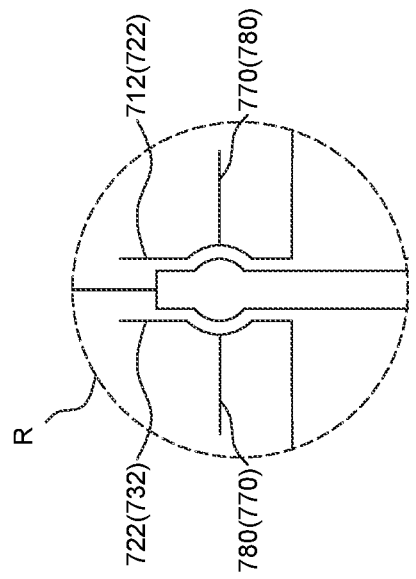
FIG. 9A and FIG. 9B are schematic diagrams showing a structure of a region of FIG. 7 according to an embodiment of the present disclosure.
Figure 9A:
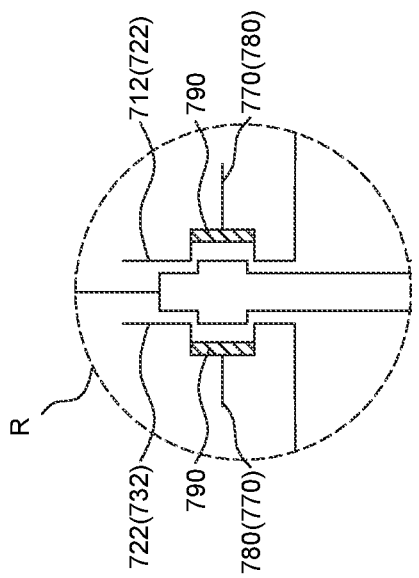

FIG. 9A and FIG. 9B are schematic diagrams showing a structure of a region of FIG. 7 according to an embodiment of the present disclosure. As shown in FIG. 9A, in embodiments of the present disclosure, the treatment device for the waste solar panels 70 further includes two sealing layers 790 disposed on the wing plate 712 and the wing plate 722, respectively. In embodiments of the present disclosure, the treatment device for the waste solar panels 70 further includes two sealing layers 790 disposed on the wing plate 722 and the wing plate 732, respectively.

The disk transport device 760 includes multiple support disks 762, and the disk transport device 760 is transported among the charge chamber 710, the pyrolysis chamber 720 and the resting chamber 730. In embodiments of the present disclosure, the disk transport device 760 can hold about 50 support disks 762 (for example, 2 parallel rows, and each row has 25 support disks 762). In embodiments of the present disclosure, the distance between the top and bottom of the support disk 762 is about 8-12 cm, for example, it can be 9 cm, 10 cm, or 11 cm.

Figures 8A, 8B:
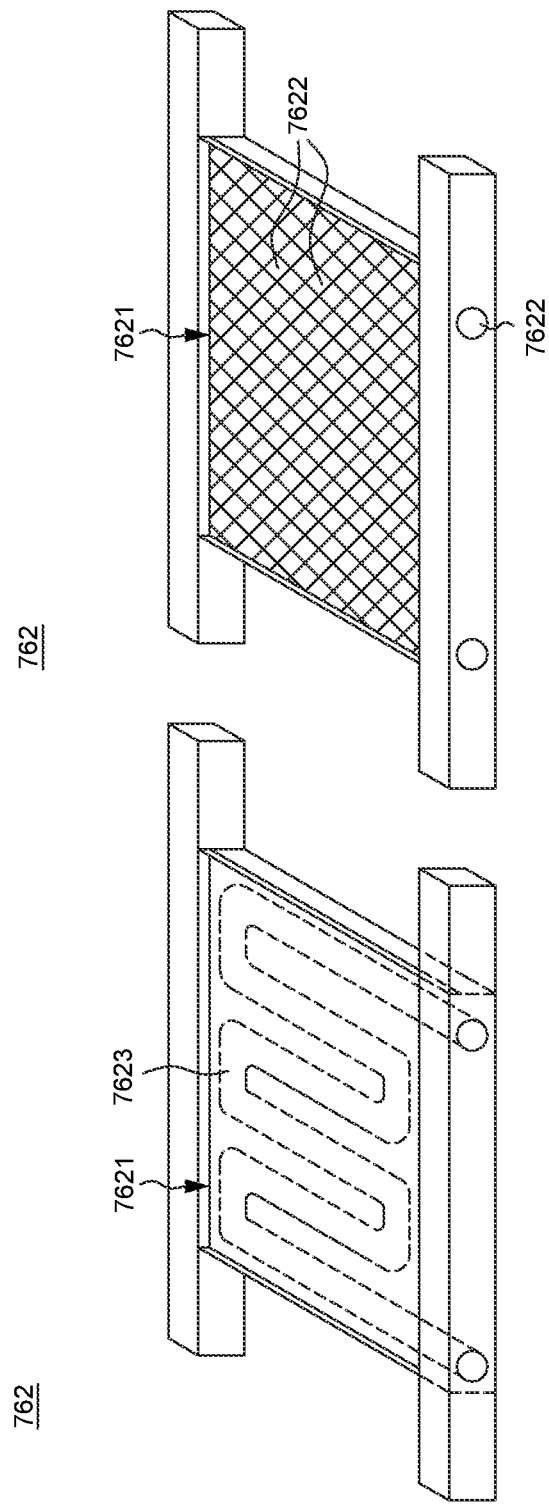
FIG. 8A and FIG. 8B are three dimensional views showing a structure of a support disk according to an embodiment of the present disclosure.

For the specific structure of the support disk 762, refer to FIG. 8A and FIG. 8B. FIG. 8A and FIG. 8B are three dimensional views showing a structure of a support disk according to an embodiment of the present disclosure. As shown in FIG. 8A, in embodiments of the present disclosure, the support disk 762 includes a hot kerosene tube 7623 buried into the bottom of the support disk 762. For example, the hot kerosene tube 7623 may have a curved shape to increase the heating area of the support disk 762. For another example, several hot kerosene tubes 7623 can be buried to increase the heating area of the support disk 762. In embodiments of the present disclosure, the thickness of the support disk 762 is between 4 cm and 6 cm, for example, it may be 5 cm. As shown in FIG. 8B, the support disk 762 has a placement notch 7621, and the bottom of the placement notch 7621 is provided with a plurality of grooves 7622. In addition, the material of the support disk 762 is copper, so that the heat of the hot kerosene tube 7623 can be evenly and quickly transferred to the entire support disk 762.

The treatment device for the waste solar panels 70 of the present disclosure provides various advantages, but these advantages are not intended to limit the present disclosure. For example, the treatment device of the present disclosure has the following advantages: (1) the hot kerosene with 350-370 degrees Celsius can be used for thermal cracking; (2) the treatment device has a positioning system for feeding and discharging; (3) simple lifting gate control and prevention of pyro gas leakage design; (4) simple pyro gas recycling system; and (5) it can treat a large number of waste solar panels, for example, the maximum processing capacity can be about 1200 kg in each batch (the thermal cracking time is about 3.5 hours).

Another objective of the present disclosure is to provide a pyrolysis method. Further, the pyrolysis method is suitable for thermally cracking waste organic polymers in waste printed circuit boards, transformers, converters, polarizers, solar panels and high-voltage power cables. For the convenience of descriptions, the pyrolysis method will be described and illustrated as a treatment method for the waste organic polymers and the waste solar panels. Therefore, those with ordinary skill in the art of the technical field of the present disclosure can recognize the treatment method for the waste organic polymers and the waste solar panels refers to the pyrolysis method. It should be understood that additional operations can be performed before, during, and after this method, and for additional embodiments of this method, some of the operations can be replaced, eliminated or moved. This method is only an exemplary embodiment, and is not intended to limit the various embodiments of the present disclosure, except for those clearly stated in the scope of the claims. This method includes the following steps. Please continue to refer to FIG. 7, FIG. 8A and FIG. 8B. First, place the catalyst used to thermally crack the thermosetting and thermoplastic organic polymers in the grooves 7622 of the support disk 762 of the treatment device for waste solar panels 70 as described above.

Next, put the waste, such as the waste solar panels, in the placement notch 7621 of the support disk 762. For the convenience of description and understanding, the following description uses the waste solar panels to represent the waste. It should be noted that the waste solar panels are in direct contact with the catalyst used to treat the organic waste, and the waste solar panels are not crushed; in other words, the complete waste solar panels are not pre-crushed, but directly placed in the placement notch 7621 of the support disk 762. For the waste circuit boards, transformers, converters, polarizers and high-voltage power cables, they are not pre-crushed, but directly placed in the placement notch 7621 of the support disk 762. In one embodiment, the waste solar panels are placed on the support disk 762 as a whole. In another embodiment, the outer aluminum frame of the waste solar panel can be removed first and then placed on the support disk 762. In more detail, the catalyst can thermally crack the backlight plate (including PET) and transparent glue (EVA) that are organic in the waste solar panels into ash. Therefore, the waste solar panels (silicon-based solar panels) after thermal cracking without any viscosity, the entire glass sheet and the entire silicon wafer can be separated naturally and can be reused. In other words, the method for treating the waste solar panels of the present disclosure uses the catalyst and thermal cracking to separate the organic matter (such as PET, EVA) and inorganic matter (aluminum frame, glass sheet, silicon wafer) in the waste solar panel, and the aluminum frame does not stick EVA at this time, so it is easily to completely separate the glass sheet and silicon wafer without deformation, without the need to disassemble the aluminum frame due to the conventional laborious disassembly, wherein the deformation is caused by the conventional laborious disassembly. Obviously, the non-deformed aluminum frame can be reused without re-molding. Because the treatment method for the waste solar panels of the present disclosure does not need to crush the waste solar panels, and the whole glass plate and the whole silicon wafer are easily separated completely without being mixed together, it is possible to increase recycling efficiency that the glass plates can be subsequently and individually recycled into glass and the silicon wafers can be subsequently and individually recycled into silicon crystals, and the recycling purity can be achieved to be more than 7N (99.99999%), and even 9N (99.9999999%). Similarly, by using the treatment method for the waste solar panels, the waste cadmium telluride solar panel can also be easily and completely separated from the entire glass plate and the entire cadmium telluride sheet without mixing together. In addition, compared with the conventional method of breaking and crushing the glass plate and the silicon crystal plate together, the treatment method for the waste solar panels of the present disclosure prevents most of the precious metals present in the silicon wafer and cadmium telluride plate from mixing with the glass, so that the recycling of precious metals becomes quite easy.

Then, the disk transport device 762 is transported from the charge chamber 710 to the pyrolysis chamber 720 and the thermal cracking reaction is performed. After the thermal cracking reaction, the waste solar panels generate the fuel gas, pyro oil, ash and residual waste solar panels (residual waste). It should be noted that the remaining waste solar panels do not contain any thermosetting and thermoplastic polymers. In more detail, before performing the thermal cracking reaction, it is necessary to confirm whether the first gate 740 and the second gate 750 are tightly sealed to the wing plates 712, 722, and 732 to avoid leakage of the pyro gas.

In one embodiment, the thermal cracking reaction includes a first stage of thermal cracking reaction and a second stage of thermal cracking reaction, the temperature of the first stage thermal cracking reaction is 205 degrees Celsius to 230 degrees of Celsius, and the temperature of the second stage thermal cracking reaction ranges from 350 degrees Celsius to 370 degrees Celsius. In particular, because the catalyst of the present disclosure makes the organic polymers produce thermal cracking reaction at a low temperature of about 205-230 degrees Celsius, the waste does not require pre-treatment water to clean the organic or inorganic contaminants on the waste. The present disclosure will not have the problem of waste water generation and waste water treatment. In one embodiment, after the fuel gas is discharged from the exhaust vent 721 of the pyrolysis chamber 720, the fuel gas enters the fuel gas storage tank GS. It should be noted that in the pyrolysis chamber 720, only organic polymers are thermally cracked. Therefore, the pyro gas produced by thermal cracking is extremely pure fuel gas. In an embodiment, the ash can be cleaned via the slag discharge port 723 of the pyrolysis chamber 720. Of course, after the fuel gas is discharged from the exhaust vent 721 of the pyrolysis chamber 720, the fuel gas can also enter the fuel gas storage tank GS through the aforementioned initial separation tank B, tge condenser E and the halide recycling device C in sequence. The pyro gas channel formed by the exhaust vent 721 of the pyrolysis chamber 720, the initial separation tank B, the condenser E and the halide recycling device C through which the pyro gas passes in sequence does not have a shut-off valve This can allow the pyro gas to be discharged without obstacles, thus preventing the risk of explosion. In addition, during the process of thermal cracking, the pryo gas in the pyro gas channel has a slightly positive pressure.

Finally, the disk transport device 760 is transported from the pyrolysis chamber 720 to the resting chamber 730 for cooling. In one embodiment, when the disk transport device 760 is cooling down in the resting chamber 730, it is not a rapid cooling. Therefore, some pyro gas is still generated. However, this part of the pyro gas contains mixed gas of air and fuel gas and is discharged from the exhaust vent 731 of the resting chamber 730. The gas discharged through the exhaust vent 731 of the resting chamber 730 can be used as auxiliary air after being cleaned.

The method for treating the waste solar panels of the present disclosure provides various advantages, but these advantages are not intended to limit the present disclosure. For example, the treatment method of the present disclosure has a lower thermal cracking temperature, can recycle and reuse complete glass and silicon wafers, and can process a large amount of waste solar panels. For another example, in the case of a transformer with a plastic casing, the present disclosure does not need to separate the metal from the plastic in advance. In particular, after the coil in the transformer is thermally cracked, a full circle of copper wire can be obtained for subsequent resource utilization efficiently.

The foregoing text outlines the features of many embodiments, so that those skilled in the art can better understand the various embodiments of the present disclosure from various aspects. Those skilled in the art should understand, and can easily design or modify other processes and structures based on the multiple embodiments of the present disclosure, so as to achieve the same purpose and/or as described herein and the same advantages in the embodiments. Those skilled in the art should also understand that these equivalent structures do not depart from the spirit and scope of the multiple embodiments of the present disclosure.

Without departing from the spirit and scope of the various embodiments of the present disclosure, various changes, substitutions or modifications can be made to the various embodiments of the present disclosure.

The invention claimed is:

1. A catalyst, comprising:
70-90 parts by weight of mica;
1-10 parts by weight of zeolite;
5-15 parts by weight of titanium dioxide;
1-10 parts by weight of aluminum oxide;
1-5 parts by weight of sodium oxide; and
1-5 parts by weight of potassium oxide.

2. The catalyst of claim 1, wherein the mica is selected from at least one of muscovite mica, hydromica, bronze mica, zinnwaldite and lithium mica.

3. The catalyst of claim 1, wherein the zeolite is selected from at least one of echellite, stilbite, heulandite, scolecite, chabazite, mordenite and cubicite.

4. The catalyst of claim 1, wherein the catalyst further comprises at least one of silicon dioxide, calcium oxide, ferric oxide and magnesium oxide.

5. The catalyst of claim 1, wherein the catalyst further comprises 1-3 parts by weight of solid base, and the solid base comprise at least one of sodium hydroxide, sodium carbonate, sodium bicarbonate, potassium hydroxide, potassium carbonate, calcium hydroxide and calcium carbonate.

6. A pyrolysis device, using the catalyst of claim 1 for thermal cracking reaction, comprising:
a vertical thermal cracking main furnace, comprising:
a furnace body, having a furnace roof, a furnace bottom and a furnace wall;
an agitator shaft, disposed upright in the furnace body, provided with multiple agitator sheets;
a thermal jacket, disposed outside the furnace wall;
a charge port, disposed on the furnace roof;
an exhaust vent, disposed on the furnace roof; and
a discharge port, disposed on the furnace bottom; and
a horizontal semi-synchronous thermal cracking auxiliary furnace, connected to the discharge port of the vertical thermal cracking main furnace.

7. The pyrolysis device of claim 6, wherein the exhaust vent of the vertical thermal cracking main furnace has a baffle extending into the furnace body, and the baffle is substantially parallel to the furnace roof.

8. The pyrolysis device of claim 6, wherein the vertical thermal cracking main furnace further comprises heat conduction components arranged between the thermal jacket and the furnace wall.

9. The pyrolysis device of claim 8, wherein the heat conduction component is composed of heat conduction fins.

10. The pyrolysis device of claim 6, wherein the thermal jacket comprises a hot air inlet, a hot air outlet, spacer plates and vents, the spacer plates are arranged at intervals between the hot air inlet and the hot air outlet, and the vents are arranged on the spacer plates.

11. The pyrolysis device of claim 6, wherein the charge port comprises:
a first stage charge port, having a first knife gate;
a second stage charge port, having a second knife gate; and
a third stage charge port, having a third knife gate, where when the first knife gate is opened, the second knife gate and the third knife gate are closed; when the second knife gate is opened, the first knife gate and the third knife gate are closed; and when the third knife gate is opened, the first knife gate and the second knife gate are closed.

12. The pyrolysis device of claim 6, further comprising:
a heat exchanger, connected to a hot air outlet of the thermal jacket;
an expansion tank, connected a working fluid outlet of the heat exchanger;
a heater, connected to a hot air inlet of the thermal jacket and a liquid outlet of the expansion tank;
an initial separation tank, connected to the exhaust vent of the vertical thermal cracking main furnace;
a condenser, connected to the initial separation tank;
a halide recycling device, connected to the condenser; and
an air storage tank, connected to the halide recycling device.

13. A pyrolysis method, at least comprising steps of:
(i) putting a waste and a catalyst into the vertical thermal cracking furnace of the pyrolysis device of claim 6 for performing a thermal cracking reaction, so as to generate a first stage pyro gas comprising a halogen gas, wherein the catalyst comprises:
70-90 parts by weight of mica;
1-10 parts by weight of zeolite;
5-15 parts by weight of titanium dioxide;
1-10 parts by weight of aluminum oxide;
1-5 parts by weight of sodium oxide; and
1-5 parts by weight of potassium oxide;
(ii) exhausting the first stage pyro gas comprising the halogen gas out from an exhaust vent on the furnace roof;
(iii) after the first stage pyro gas is exhausted out from the exhaust vent, flowing the first stage pyro gas into an initial separation tank to remove a dust in the first stage pyro gas to form a second stage pyro gas comprising the halogen gas;
(iv) flowing the second stage pyro gas into a first condenser for gas-liquid separation to generate a first stage pyro oil and a third stage pyro gas comprising the halogen gas, wherein a temperature of the first condenser is 80-120 degrees Celsius; and
(v) flowing the third stage pyro gas comprising the halogen gas into a halide recycling device to generate a fuel gas and a halide, wherein the recycling device therefore comprises a captured halogen solvent.

14. The pyrolysis method of claim 13, wherein after step (iv) is performed, the pyrolysis method further comprises steps of:
condensing the first stage pyro oil by using a second condenser to generate a second stage pyro oil; and
putting the second stage pyro oil into a regenerative energy oil tank to stand still for oil-water separation.

15. The pyrolysis method of claim 13, wherein the captured halogen solvent comprises a potassium-containing aqueous solution, a sodium-containing aqueous solution or a calcium-containing aqueous solution.

16. A pyrolysis device, comprising:
a charge chamber, a pyrolysis chamber and a resting chamber, where the pyrolysis chamber is located between the charge chamber and the resting chamber;
a first gate, disposed between the charge chamber and the pyrolysis chamber, being capable of rising or descending between the charge chamber and the pyrolysis chamber;
a second gate, disposed between the pyrolysis chamber and the resting chamber, being capable of rising or descending between the pyrolysis chamber and the resting chamber; and
a disk transport device, comprising support disks, wherein the disk transport device transports among the charge chamber, the pyrolysis chamber and the rest chamber, and each of the support disks has a placement notch, and a bottom of the placement notch has grooves;

wherein the placement notch means a receptacle or container with a top that is open to atmosphere, and each support disk comprises a hot kerosene tube buried in the support disk.

17. The pyrolysis device of claim 16, wherein the pyrolysis chamber comprises an exhaust vent and a slag discharge port, the exhaust vent is located on a ceiling of the pyrolysis chamber, and the slag discharge port is located on a bottom of the pyrolysis chamber.

18. The pyrolysis device of claim 16, wherein the charge chamber has a first wing plate surrounding an outer wall of the charge chamber, the pyrolysis chamber has a second wing plate surrounding an outer wall of the pyrolysis chamber, the first gate is arranged between the first wing plate and the second wing plate and capable of rising or descending between the first wing plate and the second wing plate.

19. The pyrolysis device of claim 18, further comprising: a pressure imposing element, sealing the first wing plate, the first gate and the second wing plate.

20. The pyrolysis device of claim 19, further comprising: two sealing layers, respectively disposed on the first wing plate and the second wing plate.

21. The pyrolysis device of claim 16, wherein the pyrolysis chamber has a first wing plate surrounding an outer wall of the pyrolysis chamber, the resting chamber has a second wing plate surrounding an outer wall of the resting chamber, and the second gate is arranged between the first wing plate and the second wing plate and capable of rising or descend between the first wing plate and the second wing plate.

22. The pyrolysis device of claim 21, further comprising: a pressure imposing element, sealing the first wing plate, the second gate and the second wing plate.

23. The pyrolysis device of claim 22, further comprising: two sealing layers, respectively disposed on the first wing plate and the second wing plate.

24. A pyrolysis method, at least comprising steps of:
(i) putting a catalyst into the grooves of one of the support disks of the pyrolysis device of claim 16, wherein the catalyst comprises:
70-90 parts by weight of mica;
1-10 parts by weight of zeolite;
5-15 parts by weight of titanium dioxide;
1-10 parts by weight of aluminum oxide;
1-5 parts by weight of sodium oxide; and
1-5 parts by weight of potassium oxide;
(ii) putting a waste into the placement notch of one of the support disks, wherein the waste directly contacts the catalyst, and the waste is not treated with crushing; and
(iii) transporting the disk transport device from the charge chamber to the pyrolysis chamber for performing a thermal cracking reaction, wherein after the thermal cracking reaction is performed on the waste, a fuel gas, a pyrolysis oil, a ash and a residual waste are generated, and the residual waste does not comprise any thermosetting and thermoplastic polymers;

wherein the placement notch means a receptacle or container with a top that is open to atmosphere.

25. The pyrolysis method of claim 24, wherein the thermal cracking reaction comprises a first stage thermal cracking reaction and a second stage thermal cracking reaction, a temperature of the first stage thermal cracking reaction is 205-230 degrees Celsius, and a temperature of the second stage thermal cracking reaction is 350-370 degrees Celsius.

26. The pyrolysis method of claim 24, wherein after step (iii) is performed, the pyrolysis method further comprises a step of:
transporting the disk transport device from the pyrolysis chamber to the resting chamber for condensing.

27. The pyrolysis method of claim 24, wherein after the fuel gas is exhausted out from an exhaust vent of pyrolysis chamber, the fuel gas flows into a gas storage tank.

* * * * *